US008621159B2

(12) United States Patent
Ware et al.

(10) Patent No.: US 8,621,159 B2
(45) Date of Patent: Dec. 31, 2013

(54) SHARED ACCESS MEMORY SCHEME

(75) Inventors: Frederick A. Ware, Los Altos Hills, CA (US); John E. Linstadt, Palo Alto, CA (US); Venu M. Kuchibhotla, Campbell, CA (US)

(73) Assignee: Rambus Inc., Sunnyvale, CA (US)

( * ) Notice: Subject to any disclaimer, the term of this patent is extended or adjusted under 35 U.S.C. 154(b) by 56 days.

(21) Appl. No.: 13/148,665

(22) PCT Filed: Feb. 3, 2010

(86) PCT No.: PCT/US2010/022986
§ 371 (c)(1),
(2), (4) Date: Feb. 24, 2012

(87) PCT Pub. No.: WO2010/093538
PCT Pub. Date: Aug. 19, 2010

(65) Prior Publication Data
US 2012/0179880 A1 Jul. 12, 2012

Related U.S. Application Data

(60) Provisional application No. 61/151,840, filed on Feb. 11, 2009.

(51) Int. Cl.
*G06F 12/00* (2006.01)
(52) U.S. Cl.
USPC ........... 711/148; 711/103; 711/105; 711/149; 711/150
(58) Field of Classification Search
None
See application file for complete search history.

(56) References Cited

U.S. PATENT DOCUMENTS

| | | | |
|---|---|---|---|
| 4,796,232 A | 1/1989 | House | |
| 5,142,638 A | 8/1992 | Schiffleger | 395/425 |
| 5,519,837 A | 5/1996 | Tran | 395/291 |
| 5,625,796 A | 4/1997 | Kaczmarczyk | 395/495 |
| 5,732,041 A | 3/1998 | Joffe | 365/230.05 |
| 5,832,303 A | 11/1998 | Murase | 710/36 |
| 5,907,862 A | 5/1999 | Smalley | 711/163 |
| 5,923,839 A | 7/1999 | Munetoh et al. | 395/185.01 |
| 6,184,906 B1 | 2/2001 | Wang et al. | 345/521 |
| 6,226,706 B1 | 5/2001 | Kim | 710/131 |

(Continued)

FOREIGN PATENT DOCUMENTS

| | | |
|---|---|---|
| EP | 0814410 | 12/1997 |
| WO | 95/05635 | 2/1995 |

OTHER PUBLICATIONS

Ware, Frederick, U.S. Appl. No. 11/460,582, filed Jul. 27, 2006 re Office Action mailed Nov. 30, 2009. 14 pages.

(Continued)

*Primary Examiner* — Shawn X Gu

(57) ABSTRACT

A memory device loops back control information from one interface to another interface to facilitate sharing of the memory device by multiple devices. In some aspects, a memory controller sends control and address information to one interface of a memory device when accessing the memory device. The memory device may then loop back this control and address information to another interface that is used by another memory controller to access the memory device. The other memory controller may then use this information to determine how to access the memory device. In some aspects a memory device loops back arbitration information from one interface to another interface thereby enabling controller devices that are coupled to the memory device to control (e.g., schedule) accesses of the memory device.

45 Claims, 15 Drawing Sheets

(56) References Cited

U.S. PATENT DOCUMENTS

| | | | |
|---|---|---|---|
| 6,240,040 B1 | 5/2001 | Akaogi et al. | 365/230.06 |
| 6,282,583 B1 | 8/2001 | Pincus et al. | 709/400 |
| 6,308,219 B1 | 10/2001 | Hughes | |
| 6,628,662 B1 | 9/2003 | Blackmon et al. | 370/447 |
| 6,717,834 B2 | 4/2004 | Zagorianakos et al. | 365/63 |
| 6,799,252 B1 | 9/2004 | Bauman | 711/149 |
| 7,058,063 B1 | 6/2006 | Cavendish | 370/395.41 |
| 7,249,207 B2 | 7/2007 | Check et al. | 710/65 |
| 7,269,158 B2 | 9/2007 | Francois et al. | 370/351 |
| 7,349,285 B2 | 3/2008 | Balasubramanian et al. | 365/230.05 |
| 2002/0075845 A1 | 6/2002 | Mullaney et al. | 370/351 |
| 2003/0135291 A1 | 7/2003 | DeLano | |
| 2004/0034749 A1 | 2/2004 | Jeddeloh | |
| 2005/0021884 A1 | 1/2005 | Jeddeloh | 710/22 |
| 2005/0050255 A1 | 3/2005 | Jeddeloh | 710/317 |
| 2005/0102444 A1* | 5/2005 | Cruz | 710/22 |
| 2005/0172066 A1 | 8/2005 | Spencer et al. | 711/103 |
| 2006/0004976 A1 | 1/2006 | Rader | 711/167 |
| 2006/0117155 A1 | 6/2006 | Ware | 711/163 |
| 2006/0171239 A1 | 8/2006 | Balasubramanian et al. | 365/230.05 |
| 2006/0236208 A1 | 10/2006 | Suzuki et al. | 714/768 |
| 2006/0248247 A1 | 11/2006 | Stewart et al. | |
| 2007/0025173 A1 | 2/2007 | Cullum et al. | |
| 2007/0091104 A1 | 4/2007 | Singh et al. | |
| 2007/0208901 A1 | 9/2007 | Purcell et al. | |
| 2007/0260841 A1 | 11/2007 | Hampel | 711/167 |
| 2008/0028127 A1 | 1/2008 | Ware | 711/100 |
| 2011/0110380 A1 | 5/2011 | Muller et al. | 370/412 |

OTHER PUBLICATIONS

International Search Report and the Written Opinion, with mail date of Jun. 30, 2010 for International Application No. PCT/US2010/022986. 14 pages.

Amendment Under Article 19 submitted Aug. 30, 2010 re PCT/US2010/022986 with Replacement Sheets 42, 45, 46, 48-52, and 61-65 including the amendments to the claims. 15 pages.

Ware, Frederick, U.S. Appl. No. 12/828,526, filed Jul. 1, 2010, Office Action with mail date of Dec. 28, 2010. 6 Pages.

PCT Response dated Jan. 19, 2011 to the communication in cases for Which no Other Form is Applicable mailed on Dec. 20, 2010 re Int'l. Application No. PCT/US2010/022986. 27 Pages.

Ware, Frederick, U.S. Appl. No. 12/828,526, filed Jul. 1, 2010, Response dated Mar. 2, 2011 to the Office Action mailed Dec. 28, 2010. 11 Pages.

Ware, Frederick, U.S. Appl. No. 12/828,526, filed Jul. 1, 2010, Response dated Sep. 22, 2011 to the Final Office Action dated Jun. 22, 2011. 13 Pages.

Ware, Frederick re U.S. Appl. No. 12/828,526, filed Jul. 1, 2010 re Advisory Action Before the Filing of an Appeal Brief dated Oct. 6, 2011. 3 Pages.

Ware, Frederick, U.S. Appl. No. 12/828,526, filed Jul. 1, 2010, Appeal Brief filed Jan. 20, 2012. 26 pages.

International Preliminary Report on Patentability (Chapter II) dated Oct. 31, 2011 re Int'l Application No. PCT/US10/22986. 34 pages.

Notification of Transmittal of the International Search Report and the Written Opinion of the International Searching Authority, or the Declaration dated Apr. 16, 2008 for PCT/US2007/074513 11 Pages.

* cited by examiner

SHARED ACCESS MEMORY SCHEME

CLAIM OF PRIORITY

This application claims the benefit of and priority to commonly owned U.S. Provisional Patent Application No. 61/151,840, filed Feb. 11, 2009, the disclosure of which is hereby incorporated by reference herein.

TECHNICAL FIELD

This application relates generally to memory technology.

BACKGROUND

Some processing systems incorporate several processing devices wherein each processing device is coupled to its own dedicated memory device. For example, a system may include a first processor for providing one type of functionality (e.g., baseband operations or graphics processing) and a second processor for providing another type of functionality (e.g., application processing). In such a system, the first processor may be coupled to a first memory device and the second processor may be coupled to a second memory device.

In practice, it may be desirable to allow each of the processors to access the memory device coupled to the other processor. For example, in some cases the same information may be used by both processors. Also, at certain times one of the processors may not utilize all of the available memory space provided by its dedicated memory device while the other processor may need access to more memory space than is provided by its dedicated memory device.

Various techniques have been employed to accomplish sharing of such memory devices. For example, in some systems the processors may cooperate to maintain duplicate images of data in the different memory devices. Such a scheme may, however, involve a relatively significant processing load associated with providing contention control and maintaining up-to-date copies of the data in each data memory. In addition, the amount of memory available for use in the system with this scheme is reduced due to the use of duplicate data structures. In some systems a private bus is provided between the processors to enable each processor to communicate with the other processor to access the memory device associated with the other processor. A scheme such as this may, however, result in relatively long latency periods and/or lower bandwidth when accessing the memory device associated with the other processor. In addition, the above schemes may consume more power as a result of forwarding data between the devices in multiple stages (e.g., across multiple links). In some applications (e.g., portable applications), however, it is highly desirable to reduce power consumption as much as possible. Consequently, there is a need for efficient techniques for sharing memory between multiple devices.

BRIEF DESCRIPTION OF THE DRAWINGS

Sample features, aspects and advantages of the disclosure will be described in the detailed description and appended claims that follow and the accompanying drawings, wherein:

Figure 1:
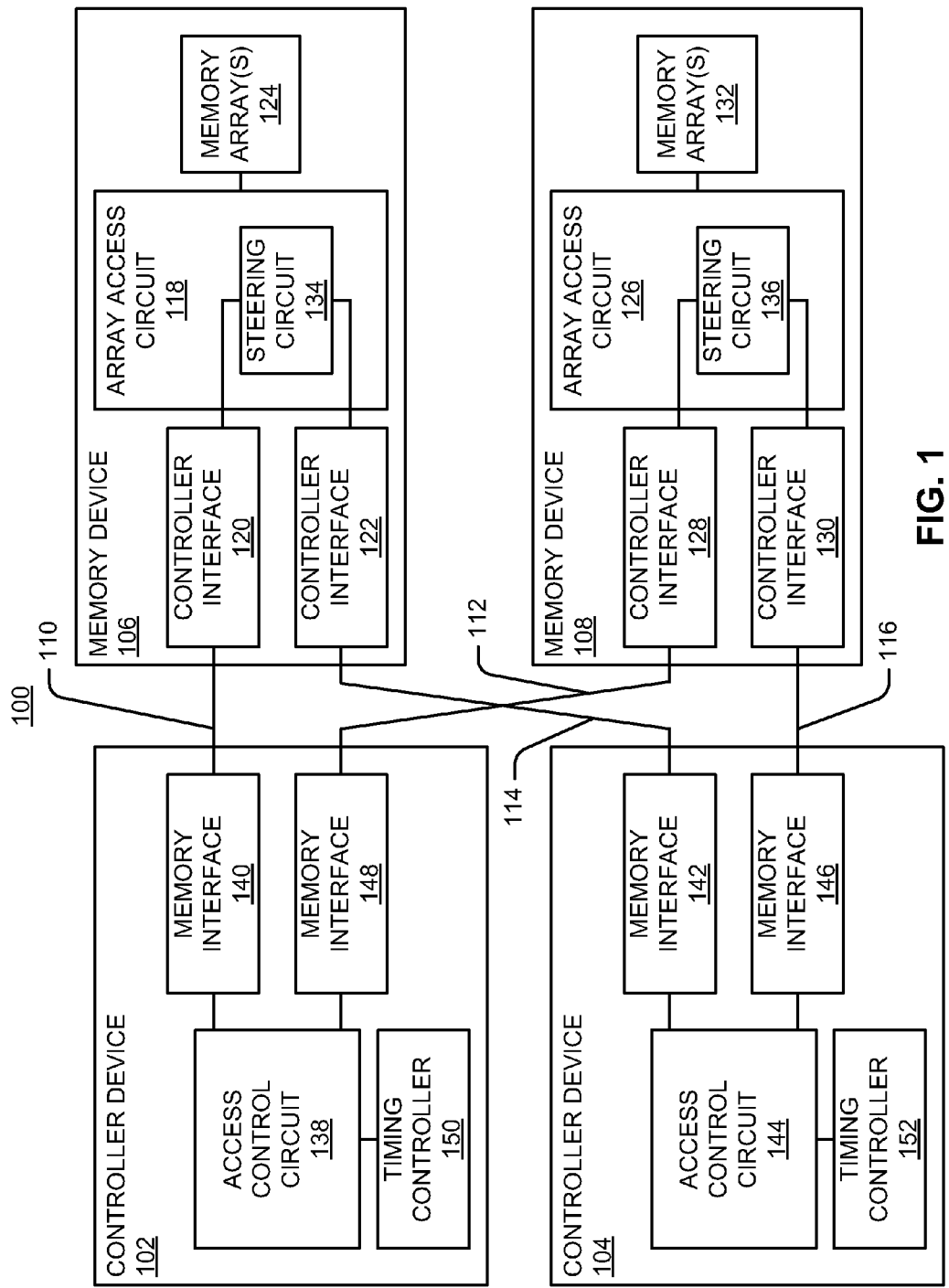
FIG. 1 is a simplified block diagram of an embodiment of a memory system where memory devices loopback control information from one interface to another interface.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

FIG. 1 illustrates a sample embodiment of a memory system 100. For illustration purposes, various embodiments are described herein in the context of a memory system including controller devices and one or more memory devices. It should be appreciated, however, that such components may be implemented within other components (e.g., processors or memory modules) and that the teachings herein may be implemented in other types of apparatuses.

The memory system 100 includes controller devices 102 and 104 and memory devices 106 and 108 that are coupled via interconnects 110, 112, 114, and 116 (e.g., memory buses including data and control signal paths). In the memory device 106, an array access circuit 118 (e.g., comprising a selection circuit such as a multiplexer) selectively couples independent controller interfaces 120 and 122 to one or more memory arrays 124. Similarly, in the memory device 108, an array access circuit 126 selectively couples independent controller interfaces 128 and 130 to one or more memory arrays 132. In addition, the controller devices 102 and 104 include independent memory interfaces 140, 148, 142 and 146, each of which may be configured to directly connect to a memory device. As described in more detail below, in some aspects a memory interface may include one or more of: at least one control and address port, at least one data port, at least one clock port, or some other type of memory bus port. This configuration of the system 100 thereby enables the controller devices 102 and 104 to access each of the memory arrays 124 and 132 of the memory devices 106 and 108.

The memory devices 106 and 108 are configured to loop back control information from one controller interface to another controller interface to facilitate the memory access operations of the controller devices 102 and 104. For example, the memory devices 106 and 108 include respective steering circuits 134 and 136 that may loop back control information such as command information, address information, control and address ("CA") information, arbitration information, or some combination of these types of information. In some aspects, control information may include one or more of: a command sent to a memory device by a memory controller device, opcode information, an address sent to a memory device by a memory controller device, address information, bank address information, row address information, page information, or precharging information An example of looping back control and address information follows. At scheduled times, an access control circuit 138 (e.g., a memory controller) of the controller device 102 uses a memory interface 140 to access the memory device 106. In this case, the steering circuit 134 may loop back to the controller interface 122 any control and address information received at the controller interface 120 that is destined for the memory array 124. Since the controller interface 122 is coupled to a memory interface 142 of the controller device 104, an access control circuit 144 of the controller device 104 may determine how the memory array 124 is currently being accessed by the controller device 102. Similarly, the steering circuit 136 may send control and address information received at the controller interface 130 to the controller interface 128 when the access control circuit 144 uses a memory interface 146 to access the memory array 132. This information is thereby looped back to a memory interface 148 coupled to the access control circuit 138 so that the access control circuit 138 may determine how the memory array 132 is currently being accessed.

Through the use of such loopback mechanisms, the controller devices 102 and 104 may more efficiently (e.g., more quickly) access the memory arrays 124 and 132 during their respective scheduled access times. For example, when the controller device 102 is accessing the memory array 124, information indicative of the type of access and the bank(s) being accessed is provided to the controller device 104 via interconnect 114. The controller device 104 may thus determine whether its subsequent access of the memory array 124 will access the same banks that are currently being accessed by the controller device 102. If not, the controller device 104 may immediately begin accessing the memory array 124 during the subsequent access time scheduled for the controller device 104. In contrast, if information regarding the type of access was not available, the controller device 104 should wait for a worst case latency interval (e.g., assuming the same bank was being accessed) before accessing the memory array 124.

Such a loopback scheme also may be advantageously employed in an implementation where a controller device needs to keep track of any changes the other controller device makes to information stored in the memory arrays. For example, if the controller device 104 maintains certain information from the memory array 124 in a local cache (not shown), the controller device 104 may monitor for write operations by the controller device 102 at the corresponding addresses of the memory array 124 (from which the cached information was obtained) to determine whether the information stored at these addresses needs to be recopied to the local cache.

Moreover, by routing this loopback information through the memory devices 106 and 108, signal phase timing may be efficiently controlled (e.g., by timing controllers 150 and 152 and/or by the steering circuits 134 and 136) to mitigate clock domain crossing issues that may otherwise arise when sending information between the controller devices 102 and 104. For example, each controller device 102 and 104 may be configured to adapt its timing to the timing of the memory devices 106 and 108. As a result, information sent from one controller device to one memory device may be readily looped back to the other controller device, without taking any additional steps to retime the information to accommodate different clock domains at the different controller devices.

In some aspects, arbitration information loopback operations involve the controller devices 102 and 104 sending arbitration information to one another via one or more of the memory devices 106 and 108. For example, the steering circuit 134 may loop back arbitration information received at the controller interface 120 to the controller interface 122. Similarly, the steering circuit 136 may loop back arbitration information received at the controller interface 130 to the controller interface 128. In some aspects the controller devices 102 and 104 exchange arbitration information via the loopback mechanism to change how the controller devices 102 and 104 access each of the memory devices 106 and 108. For example, the controller devices 102 and 104 may dynamically negotiate when a given controller device is allowed to access a given memory device. In addition, the controller devices 102 and 104 may dynamically negotiate what percentage of the available accesses for a given memory device are to be allocated to a given controller device. As a specific example, if the controller device 102 needs more access to the memory device 108 than is currently allocated, the controller device 102 may send an arbitration message to the controller device 104 requesting additional access. The controller device 104 may then send an arbitration message back to controller device 102 that indicates whether the additional access is granted and, if so, when that access may occur. As will be described in more detail below, these signaling paths may be configured such that arbitration information may be routed between the controller devices 102 and 104 even when the controller devices 102 and 104 are actively accessing the memory arrays 124 and 132.

Figure 3:
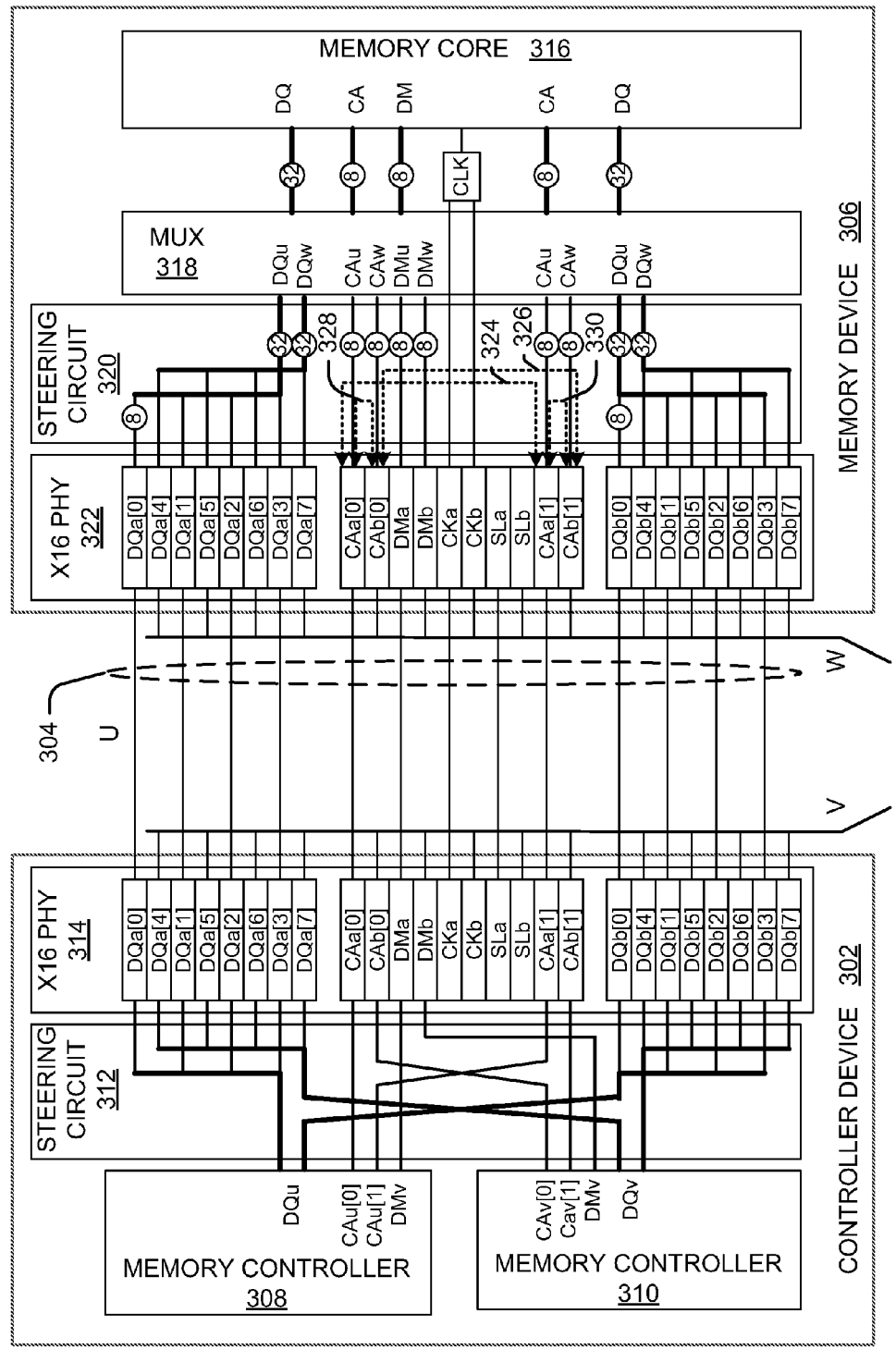
FIG. 3 is a simplified block diagram of an embodiment of a memory system illustrating sample components of a memory controller device and a memory device.
Figure 4:
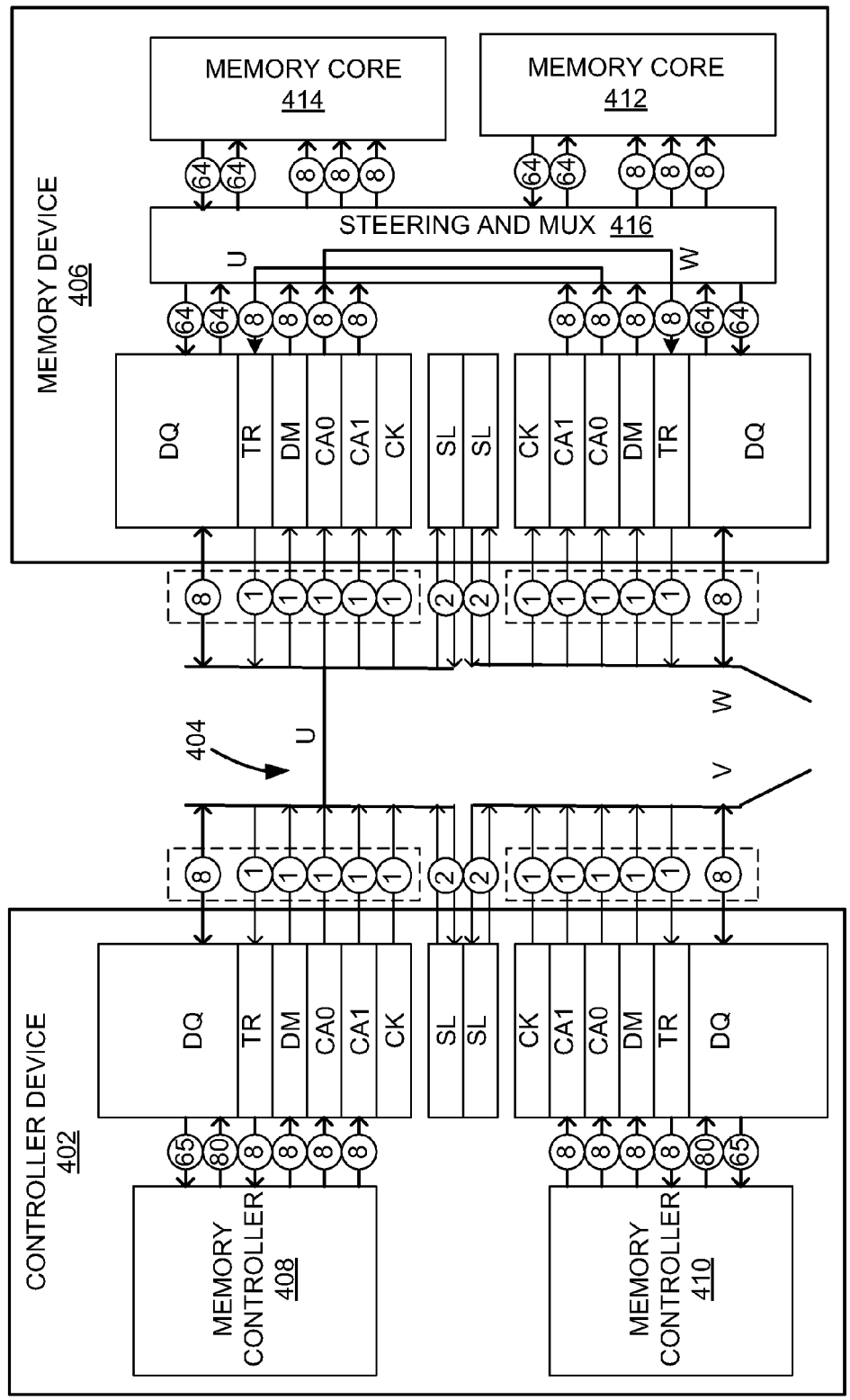
FIG. 4 is a simplified block diagram of an embodiment of a memory system illustrating sample components of a memory controller device and a memory device where the memory device includes multiple memory cores.
Figure 5A:
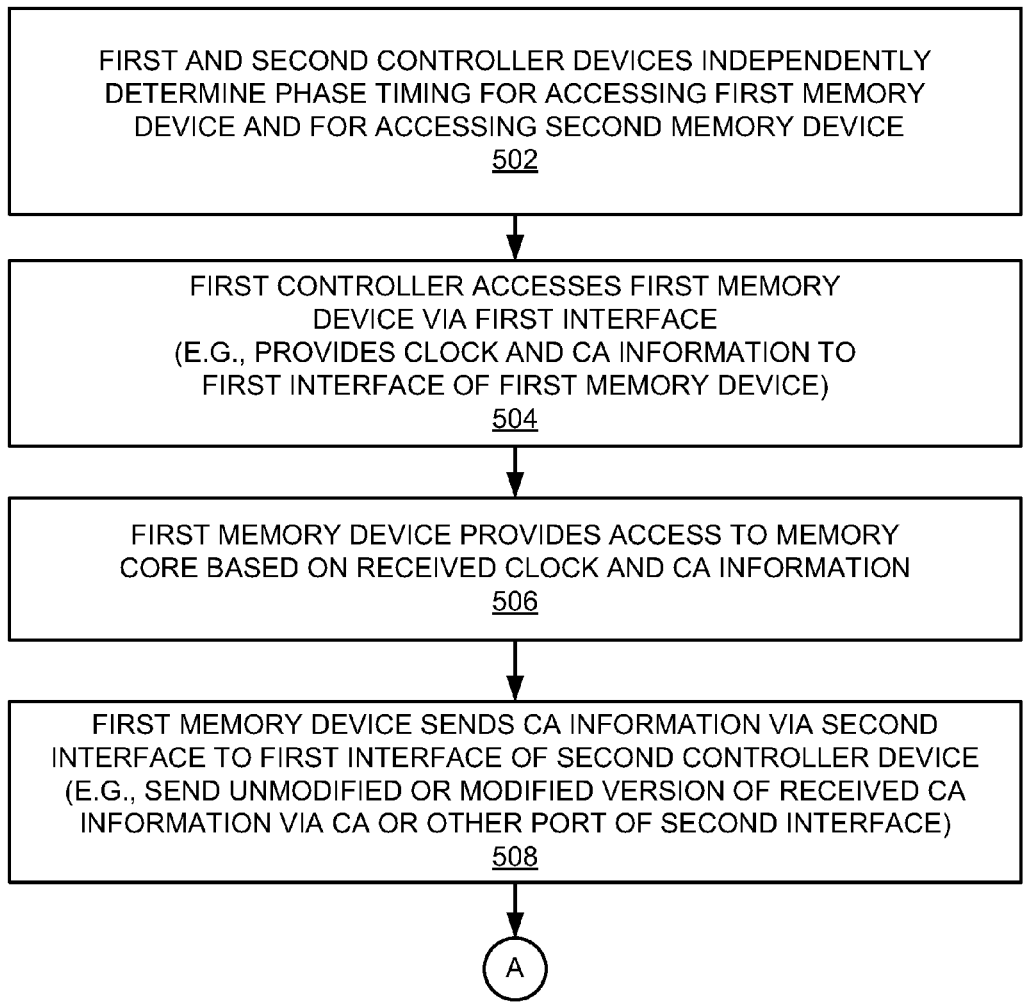
FIGS. 5A and 5B are a flowchart of an embodiment of operations that may be performed in conjunction with multiple controller devices accessing one or more memory devices.
Figure 5B:
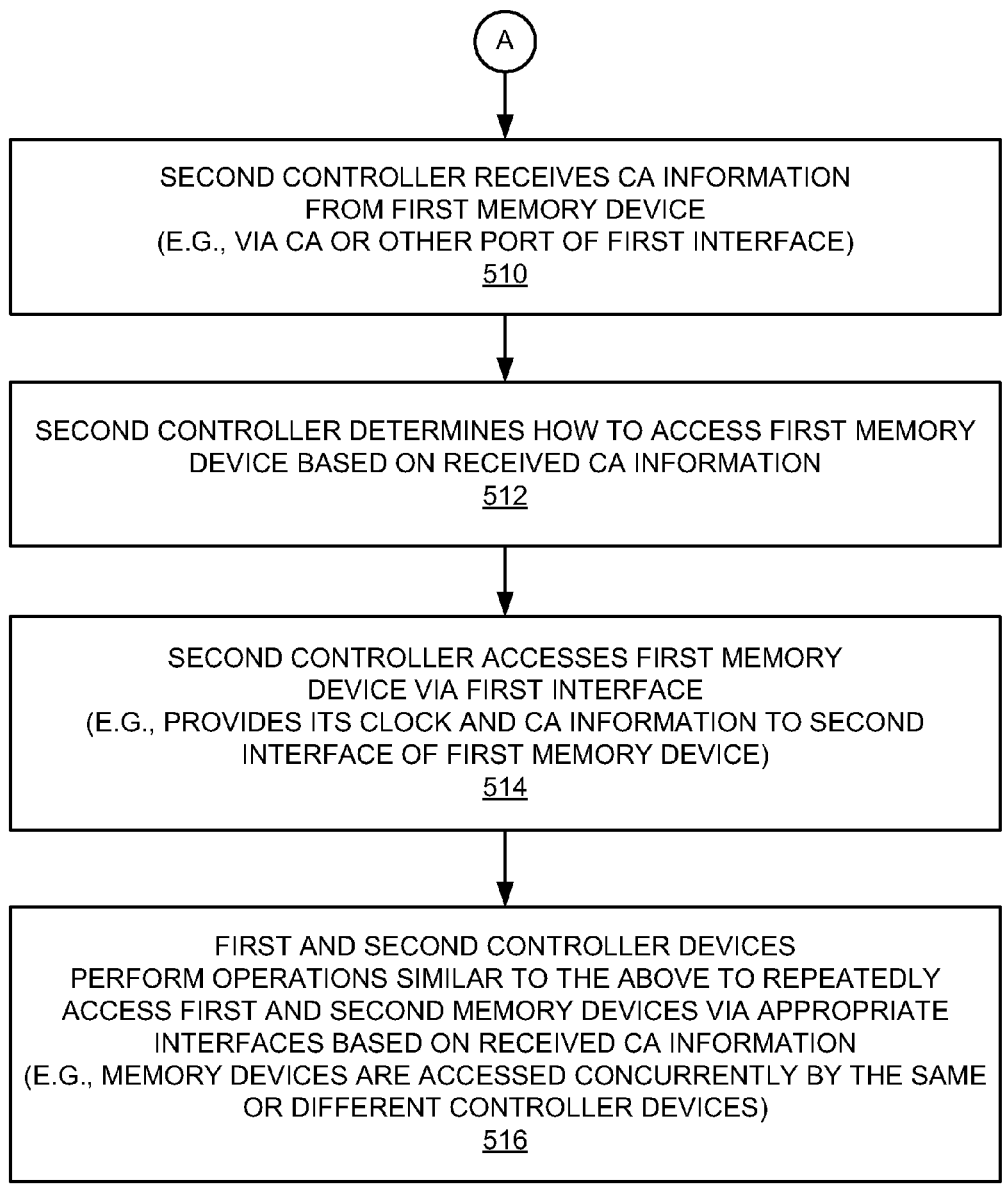
Figure 6:
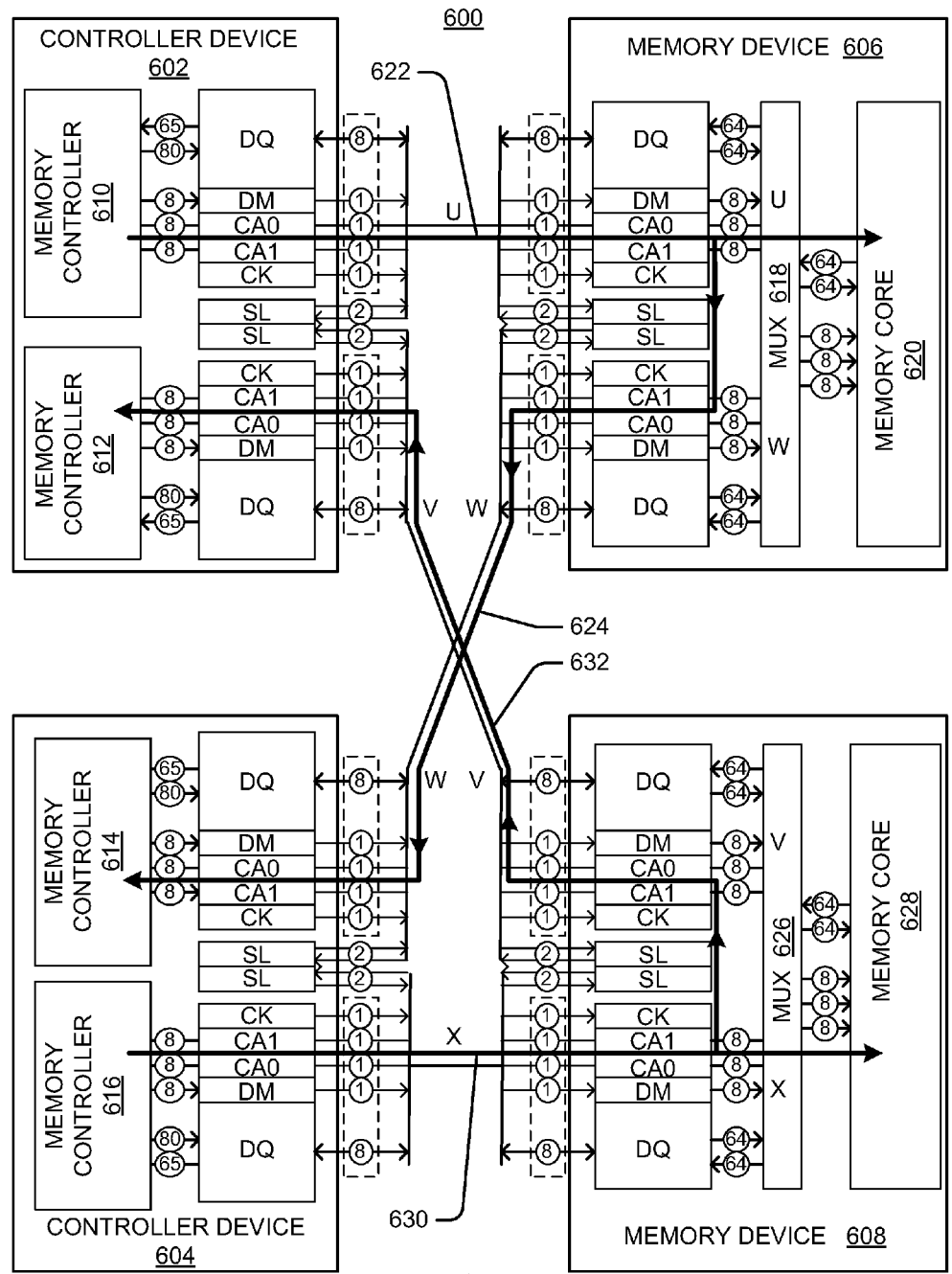
FIG. 6 is a simplified block diagram of an embodiment of a memory system illustrating one configuration where multiple memory controller devices access multiple memory devices and where control and address information is looped back to each of the memory controller devices.
Figure 7:
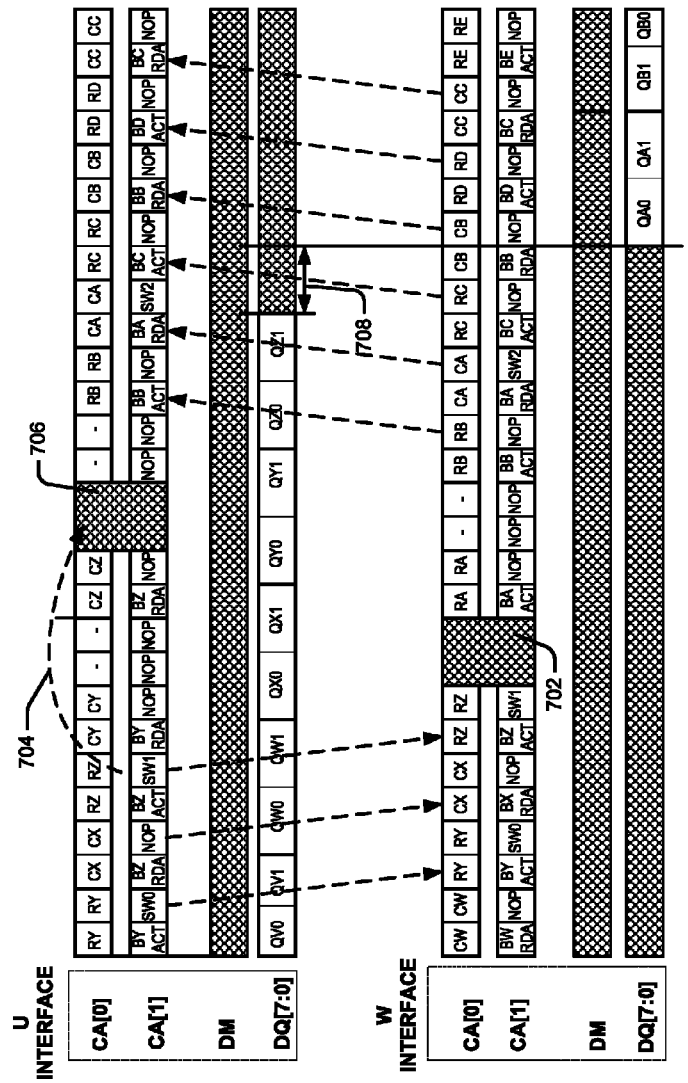
FIG. 7 is a simplified timing diagram of an embodiment of memory control operations illustrating a switch from one interface being configured to access a memory core to another interface being configured to access the memory core.
Figure 8:
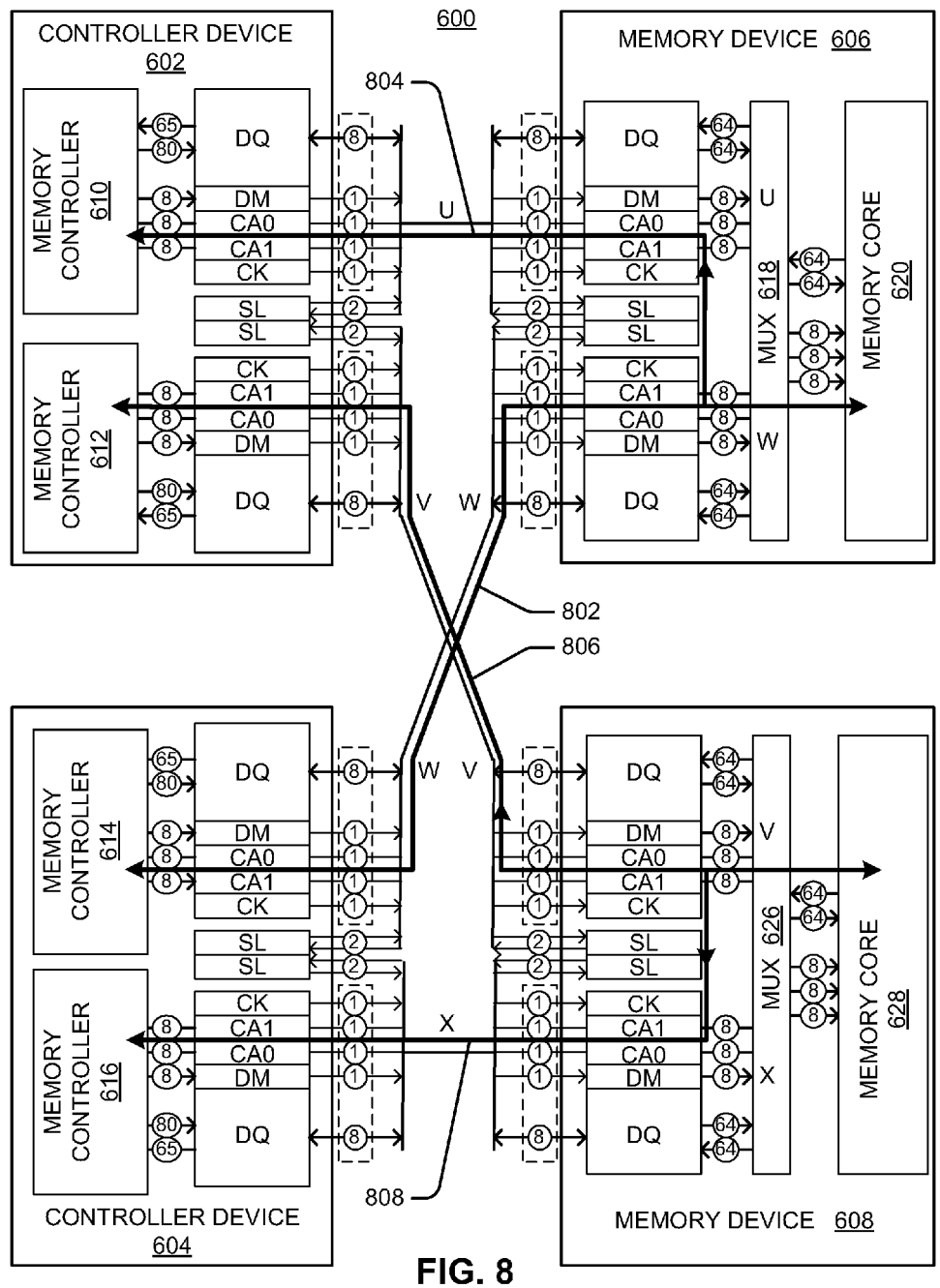
FIG. 8 is a simplified block diagram of an embodiment of a memory system illustrating another configuration where multiple memory controller devices access multiple memory devices and where control and address information is looped back to each of the memory controller devices.
Figure 9A:
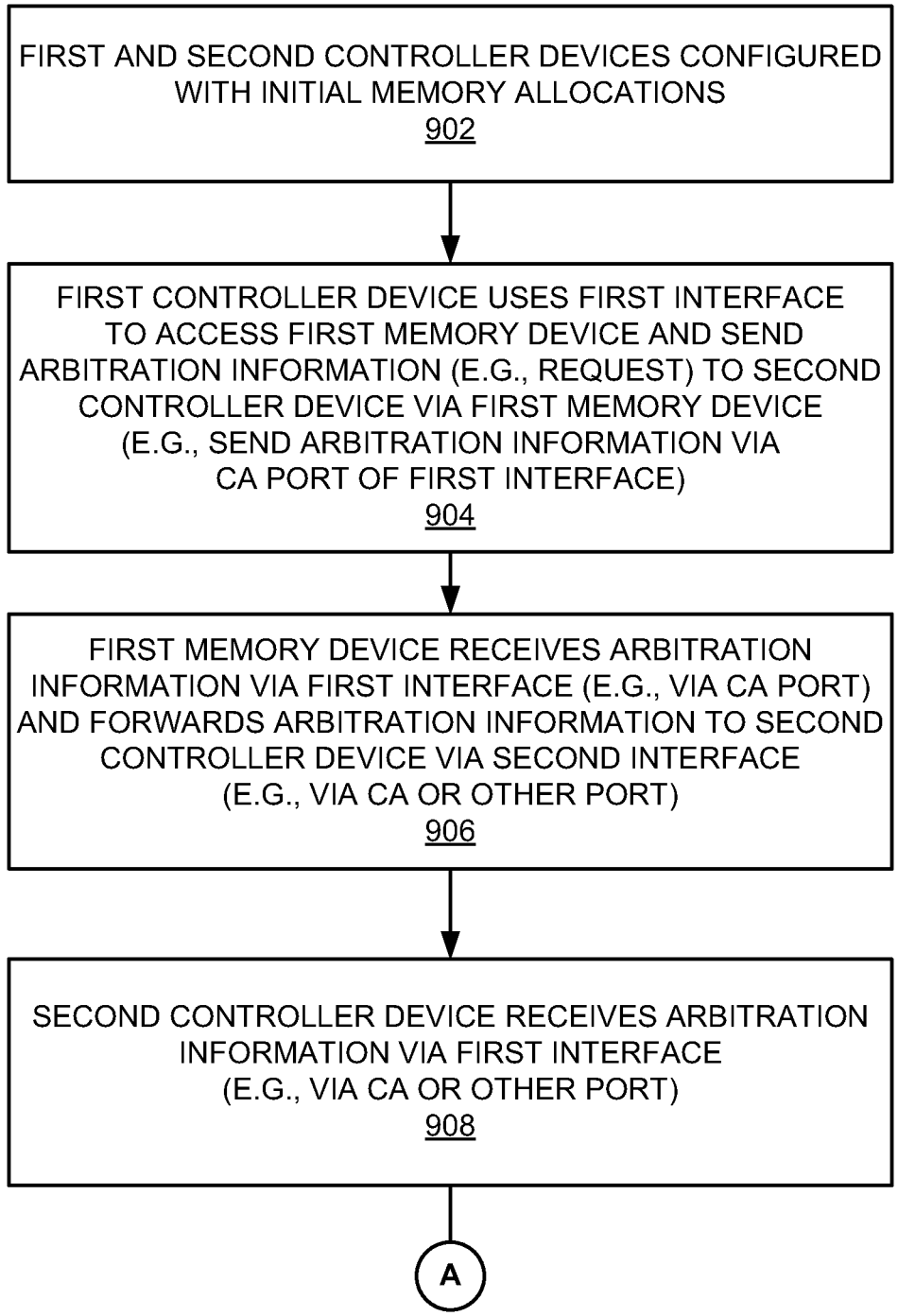
FIGS. 9A and 9B are a flowchart of an embodiment of arbitration operations that may be performed by controller devices where the arbitration information is routed through one or more memory devices.
Figure 9B:
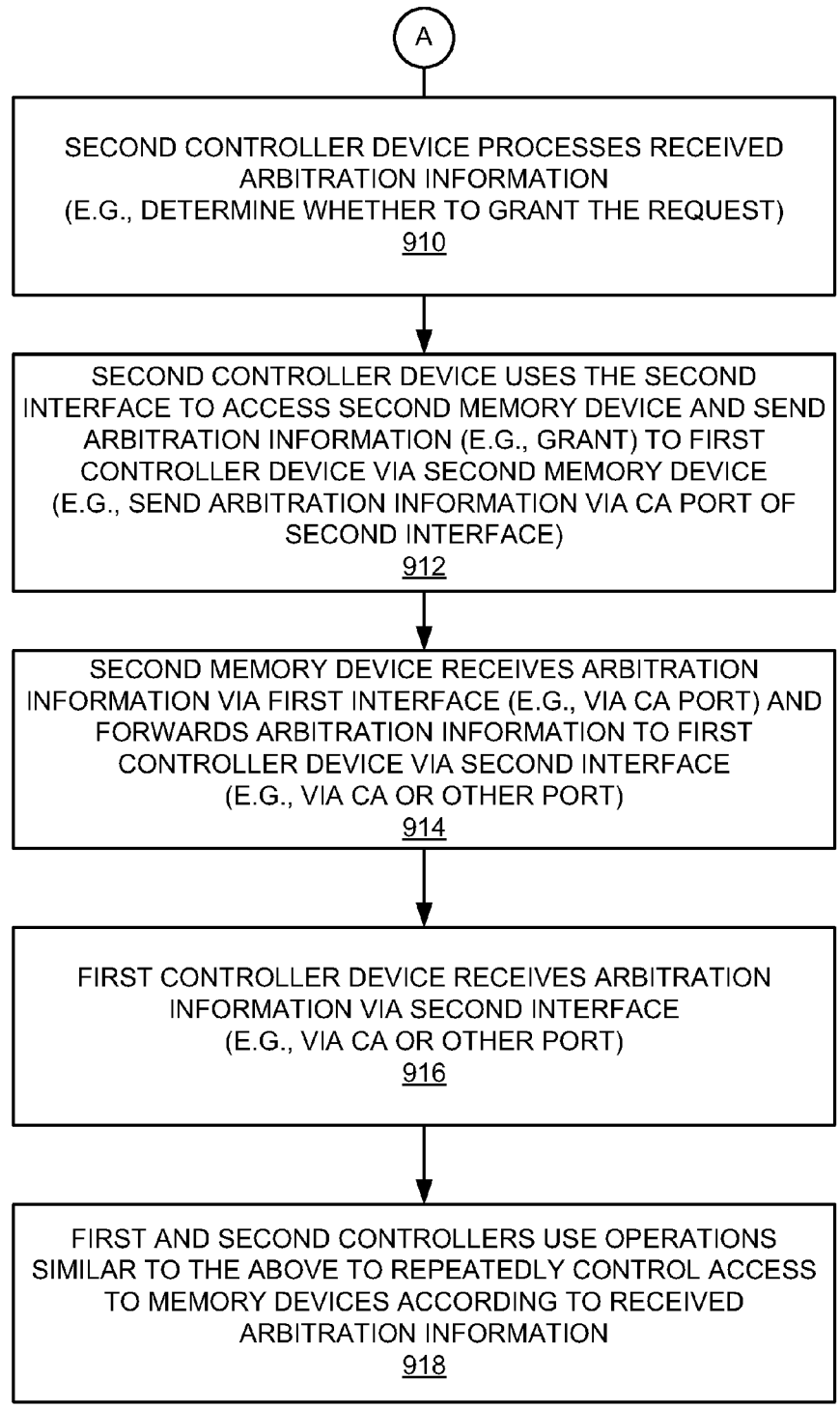
Figure 10:
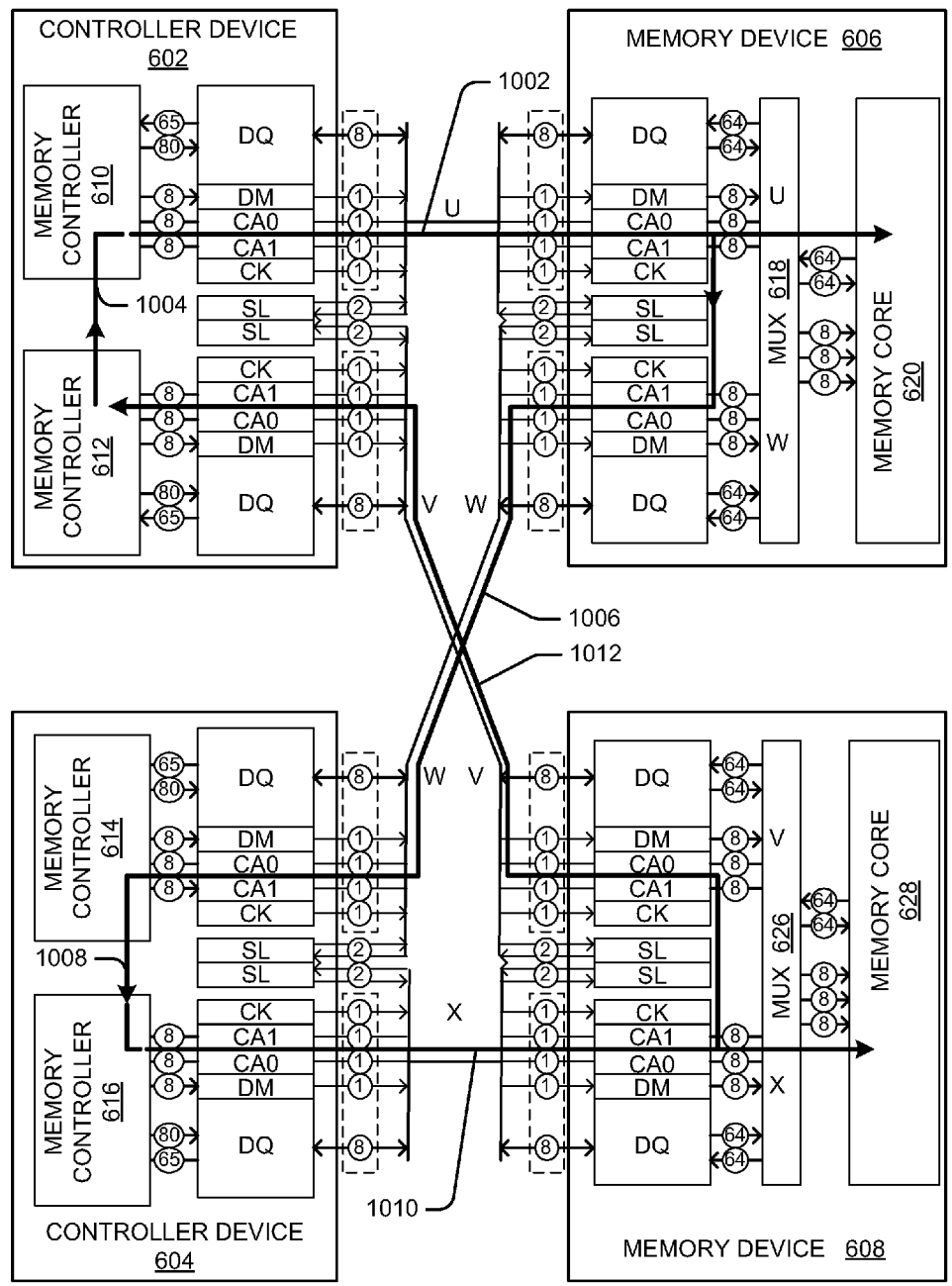
FIG. 10 is a simplified block diagram of an embodiment of a memory system illustrating a configuration where multiple memory controller devices access multiple memory devices and where arbitration information is routed between the memory controller devices via the memory devices.
Figure 11:
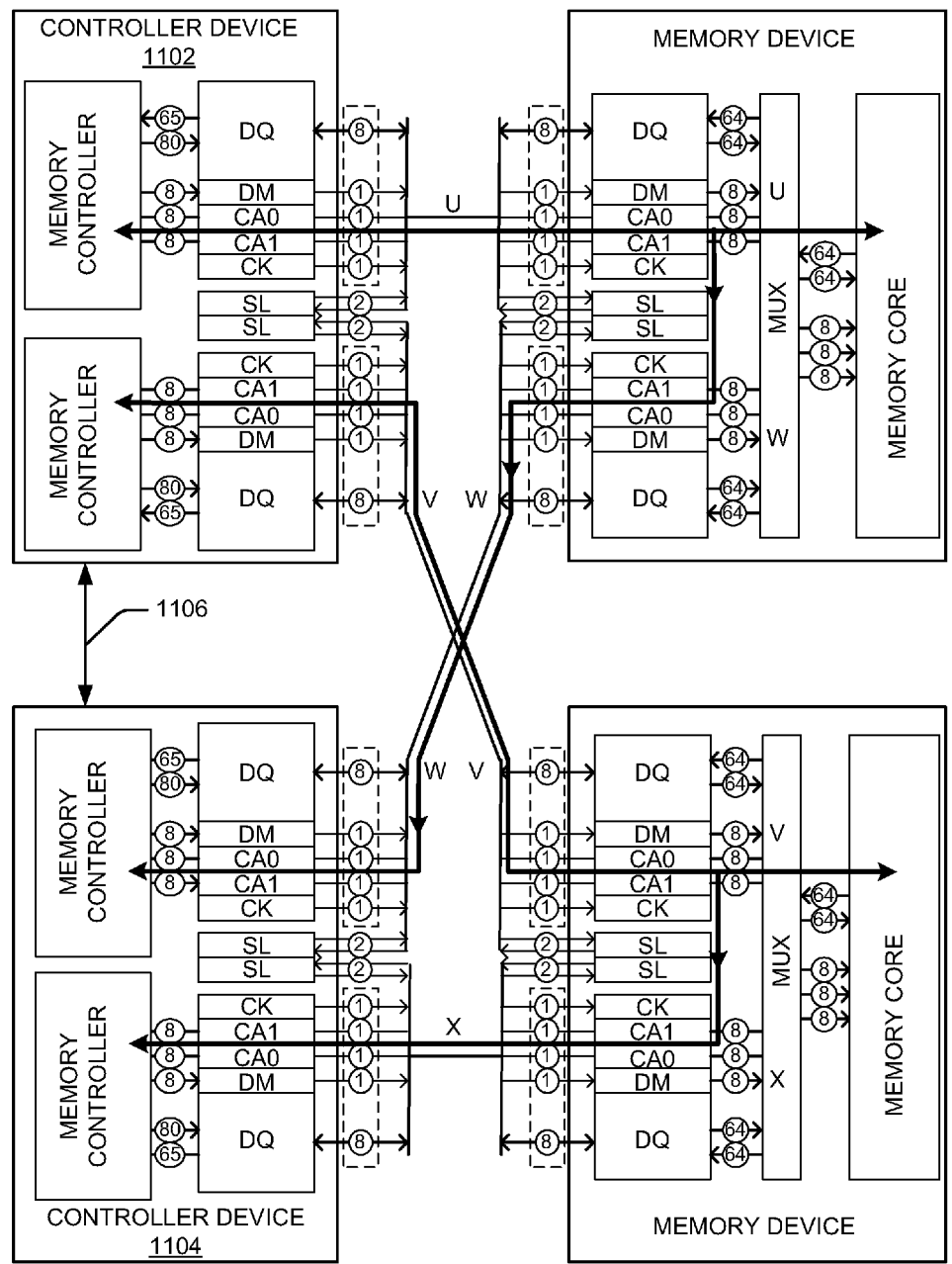
FIG. 11 is a simplified block diagram of an embodiment of a memory system illustrating another configuration where multiple memory controller devices access multiple memory devices and where arbitration information is routed between the memory controller devices via a direct interconnect.

With the above overview in mind, additional details relating to how controller devices may access memory devices, how control and address information may be looped back and used, and how arbitration information may be looped back and used will be described with reference to FIGS. 2A-11. Briefly, FIGS. 2A-2E illustrate at a conceptual level how different controller devices may access different memory devices at different times. FIG. 3 illustrates, in a relatively detailed manner, sample circuitry that may be employed in a controller device and a memory device. In this example, the controller device includes two memory controllers (one for each interface) and the memory device includes a single core. Thus, only a single memory controller may access a given memory device at a given time in this example. FIG. 4 illustrates, in a less detailed manner, sample circuitry that may be employed in a controller device and a memory device. In this case, however, the memory device includes two cores whereby two memory controllers may access a given memory device at a given time. Consequently, the example of FIG. 4 may provide higher memory access throughput than the example of FIG. 3. The flowchart of FIGS. 5A and 5B illustrates sample operations that may be employed in conjunction with controller devices monitoring memory state information to efficiently access one or more memory devices. FIG. 6 illustrates how controller devices may access memory devices and how information may be looped back in one configuration of a memory system. FIG. 7 illustrates sample control and address information that may be used in a memory system and how that control and address information may be looped back from one interface to another. FIG. 8 illustrates how controller devices may access memory devices and how information may be looped back in another configuration of the memory system of FIG. 6. The flowchart of FIGS. 9A and 9B illustrates sample operations that may be employed in conjunction with controller devices exchanging arbitration information to control access to memory devices. FIG. 10 illustrates how a memory device may loop back arbitration information from one controller device to another controller device in one configuration of the memory system of FIG. 6. FIG. 11 illustrates how arbitration information may be sent between controller devices in another implementation.

Figure 2A:
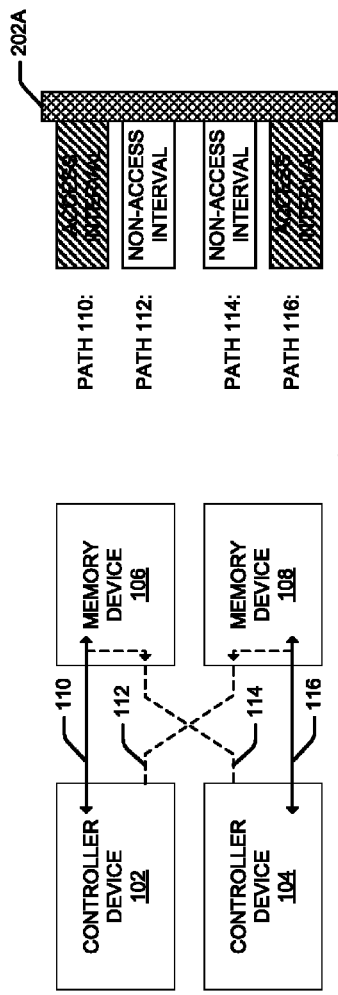
FIGS. 2A-2E are simplified diagrams illustrating an embodiment of how different controller devices may access different memory devices.
Figure 2B:
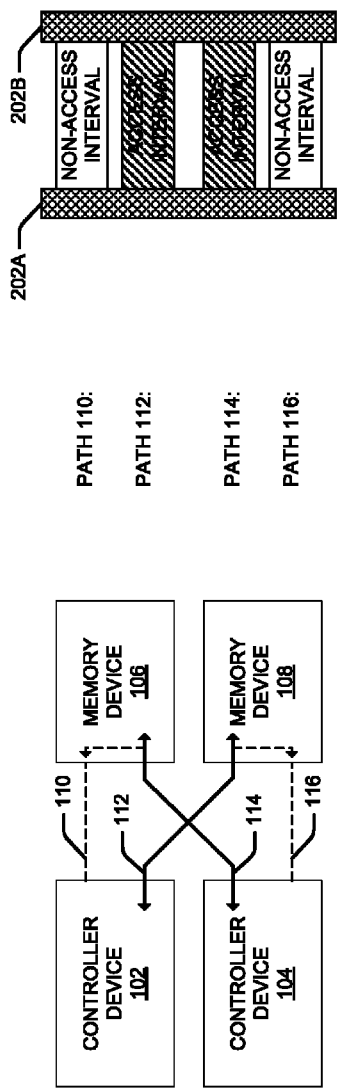
Figure 2C:
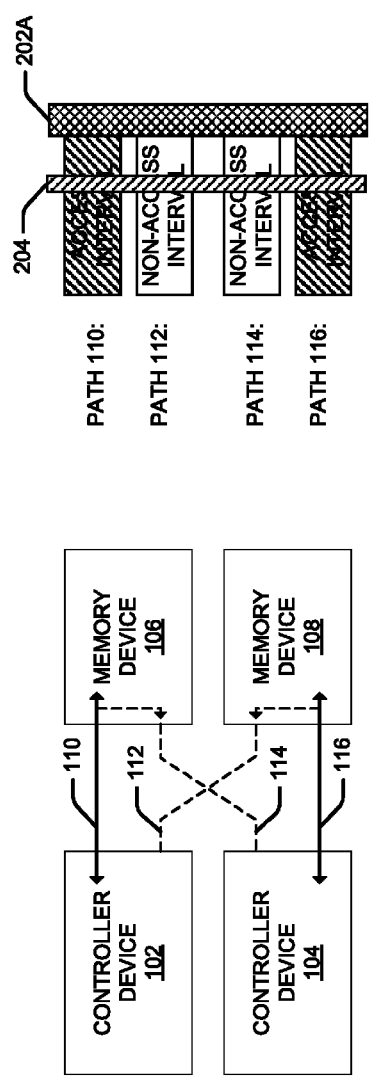
Figure 2D:
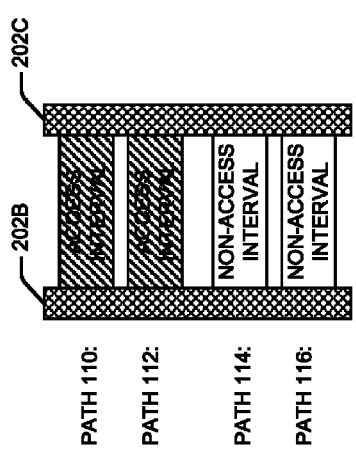
Figure 2D:
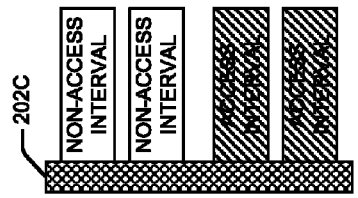
Figure 2D:
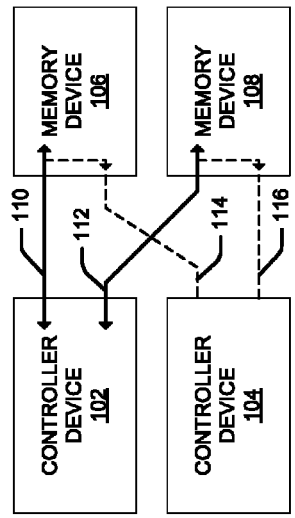
Figure 2E:
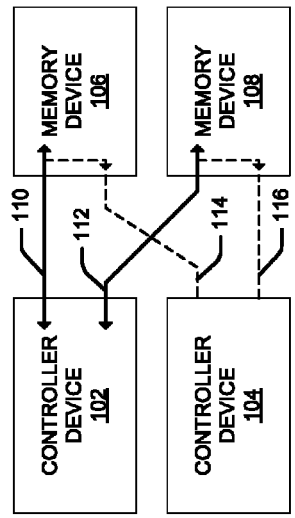
Figure 2E:
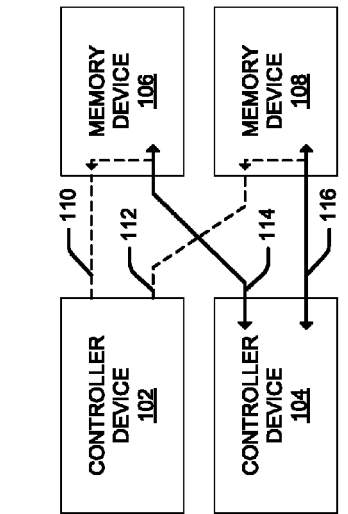

Referring initially to FIGS. 2A-2E, these figures illustrate, in a simplified manner, how a plurality of controller devices may access a plurality of memory devices and how the memory devices may loopback control information. Briefly, FIG. 2A illustrates a first configuration that is employed during a first time interval, FIG. 2B illustrates a second configuration employed during a second time interval, FIG. 2C illustrates an example of when arbitration information may be exchanged during the first time interval, FIG. 2D illustrates a third configuration employed during a third time interval, and FIG. 2E illustrates a fourth configuration employed during a fourth time interval.

In FIG. 2A, the controller device 102 accesses the memory device 106 via path 110 and the controller device 104 accesses the memory device 108 via path 116. The paths 112 and 114 are not used for memory accesses, but are instead used to loop back information as described below. The right-hand side of FIG. 2A illustrates which paths are being used for accesses during the first time interval. Here, a hatched block indicates that memory accesses may occur over that path during a given access interval. Conversely, a white block indicates a non-access interval for a given path during which memory accesses do not occur over that path, but where the path may be used for loopback.

As represented by the crosshatched portion on the right-hand side of FIG. 2A, a turnaround interval 202A is defined to facilitate setting up the controller devices and the memory devices for different access configurations. For example, as will be described below in conjunction with FIG. 7, a controller device may send a command to a memory device to initiate a switch to a different configuration and, after a turnaround time period, the new configuration may be established. In some aspects the turnaround interval may account for the state of the memory. For example a turnaround interval may be based on a row cycle time (e.g., $t_{RR}$) or a bank cycle time (e.g., $t_{RC}$).

FIG. 2B illustrates another configuration that may be employed during a second time interval following the turnaround interval 202A. Here, the controller device 102 accesses the memory device 108 via path 112 and the controller device 104 accesses the memory device 106 via path 114. The paths 110 and 116 are not used for memory accesses, but are instead used to loop back information. The right-hand side of FIG. 2B illustrates which paths are being used for memory accesses and which paths are not being used for memory accesses during the second time interval.

The arrows and dashed lines in the left-hand sides of FIGS. 2A and 2B illustrate how control information may be looped back by the memory devices 106 and 108. For example, in the configuration of FIG. 2A the memory device 106 may send the control and address information it receives from controller device 102 on path 110 to controller device 104 via path 114. In addition, the memory device 108 may send control and address information it receives from controller device 104 on path 116 to controller device 102 via path 112. In the configuration of FIG. 2B, the memory device 106 may send control and address information received from controller device 104 on path 114 to controller device 102 via path 110 while the memory device 108 sends control and address information received from controller device 102 on path 112 to controller device 104 via path 116.

Through the use of this looped back control and address information, latency penalties that may otherwise arise as a result of unknown memory states may be avoided. For example, in the configuration of FIG. 2A, the controller device 104 will receive information regarding the most recent access of controller 102 at memory device 106. Thus, the controller 104 may track state information such as the address of the bank that was accessed, the row address, which pages are open, which banks are precharging, and associated access command (e.g., opcodes). The controller device 104 may then use this information when it is scheduled to access memory device 106 to determine how to access the memory device 106. For example, based on this information the controller device 104 may determine timing for accessing the memory device 106 (e.g., how quickly it may access a given bank, etc.), or to prioritize accesses to the memory device 106 (e.g., determine the order in which banks should be accessed when multiple bank requests are pending, etc.). As a specific example, if the controller device 104 has a queued request to access a bank that was just accessed by the controller device 102, the controller device 104 may instead elect to access a different bank that was not recently accessed. In contrast, if the controller device 104 was not aware of the state of the memory device 106, the controller device 104 may simply assume the worst case, which may result in a much longer access time.

In practice, different access time periods may be defined for different configurations. As discussed below, these access time periods may be defined in a static manner (e.g., according to a default or negotiated configuration) or in a dynamic manner (e.g., as a result of arbitration negotiations that occur in response to changes in the memory requirements of the controller devices over time).

FIG. 2C illustrates how arbitration information may be routed between the controller devices for the configuration of FIG. 2A. Here, the memory device 106 sends arbitration information it receives from controller device 102 on path 110 to controller device 104 via path 114 and the memory device 108 sends arbitration information received from controller device 104 on path 116 to controller device 102 via path 112.

The hatched region 204 in the right-hand side of FIG. 2C illustrates that the arbitration information may be sent for a period of time (e.g., 2.5 ns) during the access interval for this configuration (e.g., pipelined arbitration). Then, as a result of the arbitration, a new configuration (e.g., the configuration of FIG. 2B) may be established after the turnaround interval 202A (e.g., which may be 5 ns in duration). In some aspects the definition of the turnaround interval 202A may take into account the arbitration time. For example, the turnaround interval may occur at least a certain amount of time after the arbitration messages are sent.

FIGS. 2D and 2E illustrate that in some configurations a given controller device may concurrently access multiple memory devices. Such a configuration may be used, for example, during those times that one of the controller devices has higher memory demand than the other controller device.

In the configuration of FIG. 2D, the controller device 102 accesses the memory device 106 via path 110 and accesses the memory device 108 via path 112. The paths 114 and 116 are not used for memory accesses, but are instead used to loop back information to the controller device 104. The right-hand side of FIG. 2D illustrates which paths are being used for memory accesses and which paths are not being used for memory accesses during a third time interval following a turnaround interval 202B (that follows the second time interval of FIG. 2B).

In the configuration of FIG. 2E, the controller device 104 accesses the memory device 106 via path 114 and accesses the memory device 108 via path 116. The paths 110 and 112 are not used for memory accesses, but are instead used to loop back information to the controller device 102. The right-hand side of FIG. 2E illustrates which paths are being used for memory accesses and which paths are not being used for memory accesses during a fourth time interval following a turnaround interval 202C.

As mentioned above in conjunction with FIG. 1, a memory device as taught herein may have one or more memory arrays (i.e., memory cores), each of which may be selectively coupled to any one of the independent interfaces of the memory device. For illustration purposes, two examples of memory devices are illustrated in FIGS. 3 and 4. Specifically, FIG. 3 depicts a memory device that has one single-port memory core that may be accessed via either one of two independent interfaces. FIG. 4 depicts a memory device that has two single-port memory cores, each of which may be accessed via either one of two independent interfaces. As mentioned above, the configuration of FIG. 4 may provide higher throughput since each core of the memory device may be accessed concurrently via a different one of the interfaces. It should be appreciated that in other embodiments a memory device may have more memory cores and/or more independent interfaces. In addition, the embodiments of FIGS. 3 and 4 illustrate examples where each controller device includes two memory controllers (one for each interface). In other embodiments a given controller device may have a different number of memory controllers (e.g., one, four, etc.) and/or interfaces.

Referring initially to FIG. 3, a controller device 302 is shown with one interface (interface U) connected via an interconnect 304 to one interface (interface U) of a memory device 306. In this example, the interconnect 304 comprises a series of signal paths that are delimited by the dashed circle.

The controller device 302 includes another interface (interface V) that may be coupled to an interface of another memory device and the memory device 306 includes an interface (interface W) that may be coupled to an interface of another controller device. To reduce the complexity of FIG. 3, these other controller and memory devices are not shown. FIG. 6 illustrates an example where these other devices are shown.

The controller device 302 includes a memory controller 308 (corresponding to the U interface), a memory controller 310 (corresponding to the V interface), a steering circuit 312, and a 16-bit wide physical interface 314 (designated "X16 PHY"). In some aspects, the memory controllers 308 and 310 and the steering circuit 312 may correspond to the access control circuit 138 of FIG. 1 and the physical interface 314 may correspond to the memory interfaces 140 and 148.

The steering circuit 312 couples the data (DQ), command and address (CA), and data mask (DM) ports of the memory controllers 308 and 310 to the physical interface 314. The physical interface 314 includes appropriate circuitry (e.g., buffers and connectors) to couple the signals associated with the memory controller 308 to the interconnect 304 and to couple the signals associated with the memory controller 310 to an interconnect for the interface V. In this example, the signals of the memory controllers 308 and 310 are split between "a" and "b" data groups (e.g., DQa[0-7] and DQb[0-7]) to facilitate efficient memory access operations whereby the memory controllers may swap between accessing the memory device 306 and another memory device. In addition, the non-DQ signals (e.g., CA, DM, clock CK, and sideband links SL) for the controller devices 308 and 310 are grouped at the physical interface 314 in a manner that facilitates loopback and switching operations as will be described shortly.

The memory device 306 includes a memory core 316, a selection circuit such as a multiplexer 318 (designated "MUX"), a steering circuit 320, and a 16-bit wide physical interface 322 (designated "X16 PHY"). In some aspects, the multiplexer 318 and the steering circuit 320 may correspond to the array access circuit 118 of FIG. 1 and the physical interface 322 may correspond to the controller interfaces 120 and 122.

The physical interface 322 includes appropriate circuitry (e.g., buffers and connectors) to couple the signals associated with an interface U of the memory device 306 (coupled to interconnect 304) and the signals associated with an interface W of the memory device 306 to the steering circuit 320. The steering circuit 320, in turn, routes these signals to and from the data (DQ), command and address (CA), an data mask (DM) ports of the multiplexer 318.

The multiplexer 318 is configured to couple either the interface U or the interface W of the memory device 306 to the memory core 316. As discussed herein, in some aspects the multiplexer 318 may be configured to switch between the two interfaces (e.g., during a turnaround interval) based on control signals received from one or more of the interfaces (e.g., received via the CA ports). In conjunction with such a switch, the clock signal associated with the selected interface may be coupled to the memory core 316 for clocking information into and out of the memory core 316. This clock control operation may be performed by the multiplexer 318 or by a separate timing control component (e.g., the component designated as "CLK") in different implementations.

The steering circuit 320 also may include loopback circuitry for looping back various types of information. For example, the steering circuit 320 may provide loopback functionality for controller device calibration operations and the steering circuit 320 may provide loopback functionality for feeding back control information from one interface to another interface.

As an example of the former case, the controller device 302 may include timing control circuitry (e.g., corresponding to the timing controller 150 of FIG. 1) that defines a set of phase timing values for signals to be sent to and received from the U interface of the memory device 306 and another set of phase timing values for signals to be sent to and received from a memory device that is coupled to interface V. Similarly, another controller device (e.g., such controller device 604 described in FIG. 6) may include timing control circuitry that defines a set of phase timing values for signals to be sent to and received from the W interface of the memory device 306 and another set of phase timing values for signals to be sent to and received from another memory device (e.g., coupled to an interface X of the controller device 604 of FIG. 6). Here, it should be appreciated that these phase timing values may be defined to optimize the timing margins when sending signals to and receiving signals from different devices over signal paths that provide different flight times for signals.

In some implementations a controller device defines an appropriate phase timing value by sending a calibration pattern to a memory device, whereby the memory device loops back the calibration pattern so that the controller device may determine the round-trip path delay based on the timing of the received pattern. For example, the controller device may define phase timing values for communicating with that memory device based on the round-trip path delay.

In some implementations the CA paths are used for such a calibration loopback. For example, as shown in FIG. 3, the steering circuit 320 may include a loopback path 324 that couples a CAa[0] port to a CAa[1] port and a loopback path 326 that couples a CAb[0] port to a CAb[1] port. Thus, a calibration pattern that the controller device 302 (e.g., memory controller 308) sends on CAa[0] of interface U will be looped back to the controller device 302 via CAa[1] during calibration operations (e.g., during a phase timing initialization operation). Similarly, a calibration pattern that another controller device (e.g., controller device 604 of FIG. 6) sends on CAb[0] of interface W will be looped back to that controller device via CAb[1] during calibration operations.

As discussed above, the CA signal paths also may be used during memory access operations to provide control information to controller devices. As shown in FIG. 3, the steering circuit 320 may include a loopback circuit 328 that couples CAa[0] to CAb[0] and a loopback circuit 330 couples CAa[1] to CAb[1]. Such a loopback circuit may take various forms in various implementations.

In some implementations a loopback circuit comprises a simple loopback path (e.g., a signal path) that directly couples CA ports. This technique may be employed, for example, in implementations where each of the controller devices that access the memory employ a phase calibration scheme such that the controller device adjusts its phase timing to effectively correlate to a clock domain associated with the memory device. In such a case, a CA signal sent by one controller device may be effectively received by the other controller device via the loopback without (or with a reduction in the severity of) timing domain crossing issues that may otherwise arise in conjunction with transferring information between different controller devices.

In some implementations a loopback circuit comprises a loopback path that includes a retimer circuit (e.g., domain crossing hardware such as a latch and multiplexer) for retiming a CA signal received via one interface and providing the retimed CA signal to the other interface. Such an implementation may be used, for example, to mitigate clock domain crossing issues associated with sending signals from one controller device to another (e.g., in cases where it cannot be guaranteed that the clocks received by the memory device from the controller devices are sufficiently aligned).

In some implementations a loopback circuit comprises a loopback path that includes a processing circuit for processing a CA signal received via one interface and providing the processed CA signal to the other interface. Such an implementation may be used, for example, in a case where it is desirable to compress the CA information. As an example, in an implementation where a different signal path (i.e., not a CA path) is used to send the feedback signal to a controller device (e.g., as in the example of FIG. 4), it may be desirable to minimize the number of signal paths that are used to send the CA information. In such a case, the processing circuitry may be used to provide a compressed version of the CA information (e.g., by looping back only the bank and opcode information from CA0).

In implementations such as the example of FIG. 3 where CA ports are used to provide CA information to another controller device, the CA ports of several of the components shown in FIG. 3 may be bidirectional. Here, the controller device 302 and the memory device 306 may be configured to control the direction of a given CA port based on which interface is currently scheduled to access a given memory core. For example, when interface U of the controller device 302 is scheduled to access the memory device 306, CAa[0] and CAa[1] ports (e.g., of the memory controller 308 and the physical interface 314) may be configured to output CA information. Conversely, when interface U of the controller device 302 is not scheduled to access the memory device 306, the CAa[0] and CAa[1] ports may be configured to receive state (e.g., CA) information. The CA ports of the V interface of the memory controller 302 may be controlled in a similar manner.

Also, when interface U of the memory device 306 is configured to access the memory array 316, CAa[0] and CAa[1] ports (e.g., of the physical interface 322) may be configured to receive CA information. Conversely, when interface U of the controller device is not configured to access the memory array 316, the CAa[0] and CAa[1] ports may be configured to output state (e.g., CA) information. As mentioned herein, the switching of the interface connectivity in the memory device may be controlled by control information received via one or both of the interfaces (e.g., via commands received on the CA ports). The CA ports of the W interface of the memory device 306 may be controlled in a similar manner.

Referring now to FIG. 4, a controller device 402 is shown with one interface (interface U) connected via an interconnect 404 to one interface (interface U) of a memory device 406. To reduce the complexity of FIG. 4, a portion of the interconnect 404 is simply represented by a single line.

The controller device 402 includes another interface (interface V) that may be coupled to an interface of another memory device (e.g., a comparable memory device 608 of FIG. 6) and the memory device 406 includes an interface (interface W) that may be coupled to an interface of another controller device (e.g., a comparable controller device 604 of FIG. 6). As in FIG. 3, these other controller and memory devices are not shown here to reduce the complexity of the figure.

The controller device 402 includes a memory controller 408, a memory controller 410, and two 8-bit wide physical interfaces U and V that may be similar to corresponding components of FIG. 3. In some implementations the controller device 402 may comprise a steering circuit (not shown) that may be similar to the steering circuit 312 of FIG. 3. In a similar manner as discussed above, the memory controllers 408 and 410 may be configured to independently control memory accesses via interfaces U and V, respectively.

The memory device 406 includes a memory core 412, a memory core 414, a steering and multiplexer circuit 416 (designated "STEERING AND MUX"), and two 8-bit wide physical interfaces U and W (e.g., that may be similar to corresponding components of FIG. 3).

The steering and multiplexer circuit 416 is configured to couple either of the interfaces U and W to either of the memory cores 412 and 414. For example, in one configuration interface U is coupled to memory core 414 while interface W is coupled to memory core 412 and in another configuration interface U is coupled to memory core 412 while interface V is coupled to memory core 414. As discussed herein, in some aspects the steering and multiplexer circuit 416 may be configured to switch the coupling of the interfaces to the memory cores based on control signals received from one or more of the interfaces (e.g., via CA ports).

From the above it may be seen that in the example of FIG. 4 all of the memory controllers may concurrently access the memory cores. For example, memory controller 408 may access memory core 414 while a first memory controller of another controller device (not shown in FIG. 4) accesses memory core 412. Concurrently, the memory controller 410 and a second memory controller of the other controller device (not shown) may access the two memory cores of another memory device (not shown). In contrast, in the example of FIG. 3, only two of four memory controllers (two of which are not shown in FIG. 3) may concurrently access the memory core 316 and the memory core of the other memory device (not shown).

The steering and multiplexer circuit 416 also may include loopback circuitry for looping back various types of information in a similar manner as discussed above. In this case, however, tracking TR signal paths are provided for looping the information back to the controller devices since the CA signal paths for both interfaces U and W may be continually used for memory access operations as noted above. For example, memory controller 408 may be using CA0 and CA1 of interface U to access core 414 while another memory controller (not shown) is using CA0 and CA1 of interface W to access core 412. Consequently, as these CA0 and CA1 signal paths are not available for looping back CA information, separate TR signal paths are provided for this purpose. In FIG. 4, the steering and multiplexer circuit 416 may provide loopback functionality for controller device calibration operations (e.g., by coupling the tracking ("TR") links to the data mask DM links for link calibration). In addition, the steering and multiplexer circuit 416 may provide loopback functionality for feeding back control information from one interface to another interface. In a similar manner as discussed above in conjunction with FIG. 3, in some cases a single TR signal path may be employed for each interface. For example, the received CA information may be compressed by selecting a portion of the information or by performing some other suitable operation on the received CA information. FIG. 4 illustrates that in some cases only the CA0 information (e.g., comprising bank and opcode information) is fed back to each TR signal path.

With the above in mind, a sample operational flow that may be employed in conjunction with controller devices monitoring state (e.g., CA) information to efficiently access one or more memory devices will be described in conjunction with FIGS. 5A and 5B. For convenience, the operations of FIGS. 5A and 5B (or any other operations discussed or taught herein) may be described as being performed by specific components. It should be appreciated, however, that these operations may be performed by other types of components and may be performed using a different number of components. It also should be appreciated that one or more of the operations described herein may not be employed in a given implementation.

As represented by block 502 of FIG. 5A, controller devices in a memory system may, as part of calibration procedures (e.g., upon initialization), determine phase timing for accessing memory devices as discussed above. For example, a first controller device may determine phase timing for accessing a first memory device and phase timing for accessing a second memory device. Similarly, a second controller device may determine its own phase timing for accessing the first memory device and its own phase timing for accessing the second memory device.

As represented by block 504, at a given point in time the first controller device accesses a memory device via a first one of its interfaces and a first one of the interfaces of the first memory device. This access may be scheduled based on a preconfigured or negotiated memory access schedule as discussed herein. In conjunction with this access, the first controller device provides a clock signal and CA information to the first interface of the first memory device.

As represented by block 506, the first memory device provides access to a memory core based on a clock signal and CA information received from the first controller device. In conjunction with this access, the first controller device sends data to or receives data from the first memory device via the interfaces described above.

As represented by block 508, in conjunction with the memory access of block 506, the first memory device sends the CA information it receives via its first interface to a second controller device via a second interface. As discussed above in conjunction with FIG. 3, the CA information output by the first memory device at its second interface may be in an unmodified form or a modified form as compared to the CA information that was received by the first memory device at its first interface.

As represented by block 510 of FIG. 5B, the second controller device receives the CA information from the first memory device. In some embodiments this information may be received by the CA ports of the first interface of the second controller device. As noted above in conjunction with FIG. 4, however, in other embodiments the CA information may be received via another port (e.g., a tracking port) of the interface.

As represented by block 512, the second controller device may determine how to access the first memory device based on the received CA information. For example, as discussed above in conjunction with FIG. 2, the second controller device may determine how soon it may access a memory core (e.g., a given bank of the memory core) or may elect to access a certain bank (or row, and so on) first based on the type of access performed by the first controller device immediately before the second controller device is scheduled to access the first memory device.

As represented by block 514, at the scheduled time, the second controller device uses its first interface to access the first memory device (via its second interface). As above, this access may be scheduled based on a preconfigured or negotiated memory access schedule. In conjunction with this access, the second controller device provides a clock signal and CA information to the second interface of the first memory device. The first memory device thus provides access to a memory core based on the clock signal and CA information received from the second controller device whereby the second controller device sends data to or receives data from the first memory device via the above interfaces.

As represented by block 516, the first and second controller devices and the first and second memory devices may repeatedly perform operations similar to those discussed above whereby the first and second controller devices may efficiently share the first and second memory devices. Here, it should be appreciated that operations similar to those described above for accessing the first memory device may be used for accessing the second memory device. For example, when the second controller device accesses the second memory device, the second memory device may loop back CA information received from the second controller device to the first controller device. The first controller device may then use this information to determine how (e.g., when) to access the second memory device.

FIGS. 6, 7, and 8 illustrate, in more detail, how a memory system 600 may be switched from one configuration to another configuration. FIG. 6 illustrates sample signal flow in a first configuration. FIG. 7 illustrates an example of how CA information may be looped back and how CA information may be used to initiate a configuration switch. FIG. 8 illustrates sample signal flow in a second configuration (e.g., after the configuration switch).

In the example of FIG. 6, each controller device 602 and 604 includes two memory controllers. The controller device 602 includes a memory controller 610 for controlling memory accesses via a U interface and a memory controller 612 for controlling memory accesses via a V interface. Similarly, the controller device 604 includes a memory controller 614 for controlling memory accesses via a W interface and a memory controller 616 for controlling memory accesses via an X interface.

Each memory device 606 and 608 in FIG. 6 includes two interfaces and a single memory core. The memory device 606 includes a U interface, a W interface, and a memory core 620. The memory device 608 includes a V interface, an X interface, and a memory core 628.

During calibration procedures the memory controller 610 may determine phase timing for accessing the memory device 606, the memory controller 612 may determine phase timing for accessing the memory device 608, the memory controller 614 may determine phase timing for accessing the memory device 606, and the memory controller 616 may determine phase timing for accessing the memory device 608.

In the example of FIG. 6, the controller device 602 (e.g., memory controller 610) accesses the memory device 606 via an interface U of the controller device 602 and an interface U of the memory device 606. During such an access, the memory device 606 (e.g., a multiplexer, MUX 618) provides access to the memory core 620 based on a clock signal (CK) and CA information (CA0 and CA1) received from the memory controller 610 via interface U. In conjunction with this access, the memory controller 610 sends data to or receives data from the memory device 606 via the U interfaces. The flow of the clock signal, the CA information, and the data is represented in some aspects by a line 622 in FIG. 6.

The memory device 606 sends the CA information it receives via interface U to the controller device 604 as represented by a line 624 in FIG. 6 that indicates that this information is output by the CA ports of interface W of the memory device 606. As discussed above, the CA information output by the memory device 606 at interface W may be in an unmodified form or a modified form as compared to the CA information that was received by the memory device 606 at interface U.

As represented by the line 624, in some embodiments the CA information may be received at the CA ports of the interface W of the controller device 604 and routed to the memory controller 614. As noted above, however, in other embodiments the CA information may be received via another port (e.g., a tracking port) of the interface W.

The memory controller 614 may then determine how to access the first memory device 606 based on the received CA information. For example, the memory controller 614 may determine how soon it may access the memory core 620 (e.g., a given bank of the memory core 620) or may elect to access a certain bank (or row, and so on) first based on the type of access performed by the memory controller 610 immediately before the memory controller 614 is scheduled to access the memory device 606.

FIG. 6 also illustrates signal flow associated with accessing the memory device 608. For example, the memory controller 616 may use interface X of the controller device 604 to access the interface X of the memory device 608. Here, a multiplexer (MUX 626) may control access to the memory core 628. This signal flow is represented in some aspects by a line 630 in FIG. 6. In addition, the memory device 608 may use its interface V to send the CA information received from the memory controller 616 to interface V of the controller device 602 as represented by a line 632. This information is then routed to the memory controller 612 so that the memory controller 612 can track the state of the memory core 628.

As mentioned above, a memory device may switch the interface that is coupled to a memory array based on a received command. FIG. 7 illustrates an example of signaling that may induce such a switch. The top half of FIG. 7 illustrates CA, DM, and data signals at the U interface of a memory device (e.g., coupled to a first controller device). The bottom half of FIG. 7 illustrates CA, DM, and data signals at the W interface of the memory device (e.g., coupled to a second controller device).

Initially, the U interface is configured to access the memory core of the memory device (e.g., as discussed above). Here, the data path DQ[7:0] of the interface U is carrying data QV, QW, QX, and so on. In addition, as indicated by the downward directed dashed lines in FIG. 7, CA information received via CA[0] and CA[1] of the U interface is looped back and output on CA[0] and CA[1] of the W interface. FIG. 7 illustrates an example where row and column information is provided on CA[0] and opcode and bank information is provided on CA[1]. These opcodes (and optionally switch commands such as SW0 and SW1) may include information about data transactions (e.g., transactions QY and QZ, respectively).

In addition, the switch command SW1 may include information (e.g., a steering bit or bits) that triggers reconfiguration of the memory device. For example, after the SW1 command is received at interface W, a CA turnaround time interval (represented by a crosshatched portion 702) may occur at interface W.

Similarly, as represented by a dashed line 704, after the SW1 command is received at interface U, a CA turnaround time interval (represented by a crosshatched portion 706) may occur at interface U. After the turnaround time interval 706, as indicated by the upward directed dashed lines in FIG. 7, CA information received via CA[0] and CA[1] of the W interface is looped back and output on CA[0] and CA[1] of interface U. In addition, data transfers on the data path of interface U will be terminated (after QZ1 in this example).

Since the second controller device received information about the accesses on the U interface (e.g., in particular the last access QZ1), accesses may commence relatively quickly on the W interface after the last access on the U interface (e.g., within a $t_{RC}$ interval of a transaction on the U interface). In the example of FIG. 7, the second controller device may determine that the transactions QW, QX, QY, and QZ used different banks than will be used by the transaction QA. In this case, the transaction QA may begin immediately. Also, in this example, given precise coordination between the interfaces U and W (e.g., within two 0.625 ns clock cycles), the transaction QA may begin a relatively short period of time (e.g., approximately 5 ns as indicated by the arrow 708) after the last access on the U interface.

Referring now to the configuration of FIG. 8, after such a turnaround, the controller device 604 may now use its interface W to access the memory device 606 (via its interface W). This configuration is illustrated in FIG. 8 where the flow of the clock signal, the CA information from the memory controller 614, and the flow of data to or from the memory controller 614 are represented in some aspects by a line 802.

In this configuration, the controller device 602 (e.g., memory controller 610) may monitor the CA information output by the memory controller 614 so that the memory controller 610 may efficiently access the memory device 606 at its next scheduled access time. The flow of this CA information is represented by a line 804 in FIG. 8 that indicates that this information is output by the CA ports of interface U of the memory device 606 and is received by the CA ports (or TR port in other embodiments) of the interface U of the controller device 602 and routed to the memory controller 610.

FIG. 8 also illustrates another embodiment of signal flow associated with accessing the memory device 608. Here, the memory controller 612 may use interface V of the controller device 602 to access the interface V of the memory device 608. This signal flow is represented in some aspects by a line 806 in FIG. 8. In addition, the memory device 608 may use interface X to send the CA information received from the memory controller 612 to interface X of the controller device 604 as represented by a line 808. This information is then routed to the memory controller 616 so that the memory controller 616 can track the state of the memory core 628.

It also should be appreciated that similar operations may be performed for configurations where a given controller device is accessing both of the memory devices. In such a case, the other controller device (e.g., its memory controller components) may track the states of the memory cores of the memory devices.

In addition, in some implementations circuitry associated with an interface that is not currently accessing a memory core may be configured to a low-power state (e.g., powered-down). For example, in the configuration of FIG. 6 the data (DQ) and data mask (DM) links of the V and W interfaces of the controller devices and the memory devices may be set to low-power state. Conversely, in the configuration of FIG. 8 the data (DQ) and data mask (DM) links of the U and X interfaces of the controller devices and the memory devices may be set to low-power state.

Referring now to FIGS. 9A and 9B, sample arbitration operations that may be performed by two or more controller devices of a memory system are described. For illustration purposes these operations will be described in the context of a memory system where arbitration information (e.g., messages) is routed between the controller devices via the memory devices.

As represented by block 902 of FIG. 9A, at some point in time the controller devices are configured with initial memory allocations. For example, upon initialization or at some other time a first controller device may be allocated 60% of the memory accesses for a first memory device and a second controller device may be allocated the remaining 40% of the memory accesses. Similarly, the first controller device may be allocated 50% of the memory accesses for a second memory device and the second controller device may be allocated the other 50% of the memory accesses. In some implementations, the memory allocations may take the form of a schedule that specifies, for example, when a given controller device may access a given memory device.

As represented by block 904, based on the current allocation, the first controller device may use its first interface to access the first interface of the first memory device. The first controller device also may send arbitration messages to the second controller device using the loopback mechanism described herein. For example, if the first controller device needs to change its scheduled access to the second memory device, the first controller device may generate an arbitration message and send the message during a scheduled access time over its first interface (e.g., via a CA port). In some situations such a message may comprise a request to access the second memory device (e.g., as soon as possible or at a designated time). Here, the message may be sent via an appropriate field of an existing command, via an arbitration-specific command, or in some other suitable manner.

As represented by block 906, the first memory device receives the arbitration message via its first interface. The first memory device may then output the arbitration message (e.g., in its original form) via its second interface (e.g., via one or more CA or other suitable ports). Here, the first memory device may be configured to ignore any arbitration messages it receives on the CA links of an active interface. For example, the first memory device may treat an arbitration message as a NOP.

As represented by block 908, the second controller device receives the arbitration message via its first interface. For example, this information may be received via a CA port or some other port (e.g., a TR port) as discussed herein.

As represented by block 910 of FIG. 9B, the second controller device processes the received arbitration information. For example, the second controller device may grant or deny a request to access the second memory device or may elect to change the current memory allocation in some way. When determining how to control access to the second memory device, the second controller device may take into account any memory access requests it has received from other sources (e.g., an associated processor or another controller device).

As represented by block 912, the second controller device may send arbitration information to the first controller device via the second memory device. For example, if the second controller device elects to grant the requested access to the second memory device, the second controller device may generate an arbitration message and send it during a scheduled access time to the second memory device via a second interface of the second controller device (e.g., via a CA port). As above, such a message may be sent via an appropriate field of an existing command, via an arbitration-specific command, or in some other suitable manner.

As represented by block 914, the second memory device receives the arbitration message via its second interface. The second memory device then outputs the arbitration message (e.g., in its original form) on its first interface (e.g., via one or more CA or other suitable ports) that is coupled to the first controller device. As above, the second memory device may be configured to ignore any arbitration messages it receives on the CA links of an active interface.

As represented by block 916, the first controller device receives the arbitration message via its second interface (e.g., via one or more CA or other suitable ports). The first controller device may thereby process the receive arbitration message in an appropriate manner (e.g., to change its scheduled memory accesses).

As represented by block 918, the controller devices and the memory devices may repeatedly perform operations similar to those discussed above. In this way, the controller devices may control access to the memory devices (e.g., control the amount of memory bandwidth provided to each controller device, schedule at least one access time, define at least one access allocation, and so on) based on received and/or transmitted arbitration information. Here, it should be appreciated that the second controller device also may initiate an arbitration operation by sending, for example, a request to the first controller device via the second memory device.

FIG. 10 illustrates a detailed example of how arbitration information may flow from one controller device to another. This example is described in the context of the controller devices 602 and 604 and the memory devices 606 and 608 configured as shown in FIG. 6. Thus, the flow of the associated access commands from the U interface of the controller device 602 to the U interface of the memory device 606 is represented in some aspects in FIG. 10 by a line 1002. In addition, the flow of the associated access commands from the X interface of the controller device 604 to the X interface of the memory device 608 is represented in some aspects by a line 1010.

The controller device 602 sends arbitration messages to the controller device 604 using the CA loopback mechanism described herein. For example, if the memory controller 612 needs to modify its scheduled access to the memory core 628, the memory controller 612 may generate an arbitration message and send it during a scheduled access time to the memory controller 610 as indicated by a line 1004. In some situations such a message may comprise a request to access the memory core 628 (e.g., as soon as possible or at a designated time).

The memory controller 610 may then forward the message to the memory device 606 via the U interface of the controller device 602. As mentioned above, the message may be sent via an appropriate field of an existing command, via an arbitration-specific command, or in some other suitable manner.

The memory device 606 receives the arbitration message via its U interface. The memory device 606 may then output the arbitration message (e.g., in its original form) via the W interface (e.g., via one or more CA or other suitable ports) of the memory device 606. Here, the memory device 606 may be configured to ignore any arbitration messages it receives on the CA links of an active interface. For example, the memory device 606 may treat an arbitration message as a NOP.

The controller device 604 receives the arbitration message via its W interface. The flow of the arbitration message through the loopback path of the memory device 606 to the memory controller device 614 is represented by a line 1006 in FIG. 10.

The memory controller 614 may then forward the arbitration message to the memory controller 616 as represented by a line 1008. The memory controller 616 processes the received arbitration information by, for example, granting or denying a request to access the memory core 628 or changing the current memory allocation in some way. When determining how to control access to the memory core 628, the memory controller 616 may take into account any memory access requests it has received from other sources (e.g., an associated processor or another controller device).

The controller device 604, in turn, sends arbitration information to the controller device 602 via the memory device 608. For example, if the memory controller 616 elects to grant the requested access to the memory core 628, the memory controller 616 may generate an arbitration message and send it during a scheduled access time to the memory device 608 via the X interface of the controller device 604 as represented by a line 1010. As above, such a message may be sent via an appropriate field of an existing command, via an arbitration-specific command, or in some other suitable manner.

The memory device 608 receives the arbitration message via its X interface. The memory device 608 then outputs the arbitration message (e.g., in its original form) via the V interface (e.g., via one or more CA or other suitable ports) of the memory device 608. As above, the memory device 608 may be configured to ignore any arbitration messages it receives on the CA links of an active interface.

The controller device 602 receives the arbitration message via its V interface. The flow of the arbitration message through the loopback path of the memory device 608 to the memory controller 612 is represented by a line 1012 in FIG. 10. The memory controller 612 may thereby process the receive arbitration message in an appropriate manner.

FIG. 11 illustrates another embodiment where arbitration information may be sent between memory controllers 1102 and 1104 via one or more sideband links 1106. This configuration may be used, for example, in a case where the CA ports or other suitable ports are not available for arbitration traffic (e.g., in an embodiment as described in FIG. 4). For example, in some cases is may be desirable for signal path routing purposes to restrict the number of signal paths between the controller devices and the memory devices. For cases that utilize such direct links between the memory controllers 1102 and 1104, one or both of the memory controllers 1102 and 1104 may incorporate components (e.g., retiming circuits) to mitigate timing domain crossing issues. Hence, the use of direct arbitration links also may be considered in cases where the implementation of such domain crossing circuitry does not have a significant impact on one or more of the cost, performance, or chip area of the controller devices.

In view of the above it may be seen that a memory system constructed in accordance with the teachings herein may advantageously enable multiple controller devices to efficiently access one or more memory devices and cooperate to define memory access allocations. For example, as compared to implementations that share memory space by using a private bus between controller devices, a memory system constructed in accordance with the teachings herein may provide a single coherent memory space, shorter access times (e.g., by allowing direct access to each memory device), higher bandwidth (e.g., due to lower latency), concurrent access (e.g., due to comparable access times at each memory device), and lower power consumption (e.g., due to the use of fewer memory busses).

Moreover, these advantages may be achieved without significantly impacting integrated circuit (chip) area. For example, for a system that uses single-core memory devices, a controller device constructed in accordance with the teachings herein may use a comparable amount of chip area as compared to a controller in a private bus scheme. In addition, in this case the area impact at the memory device may be relatively minor since the additional interface area may be located at the periphery of the chip (which may not be otherwise utilized) and only a relatively small area may be needed for the added steering circuitry. For a system that uses dual-core memory devices, a controller device constructed in accordance with the teachings herein may use half the chip area as compared to controller in a private bus scheme. In addition, in this case the area impact at the memory device may be relatively minor since only a relatively small area may be needed for the added steering circuitry.

The teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

It should be appreciated that a controller device (e.g., an integrated circuit incorporating controller functionality) and a memory device (e.g., an integrated circuit incorporating a memory core) as taught herein may take various forms. For example, a controller device may comprise a memory controller chip, a processor chip that includes controller functionality, or some other suitable device. In some aspects a memory device may comprise a semiconductor integrated circuit device that includes a set of storage cells, which may collectively provide a memory array or a portion of a memory array. Examples of such memory devices include volatile memory devices, nonvolatile memory devices, DRAMs, SRAMs, and flash memory devices.

A memory system as taught herein may be used in a variety of applications. For example, such a memory system may be incorporated into a portable device (e.g., a cell phone), a computer graphics card, a videogame console, a printer, a personal computer, a server, or some other apparatus that utilizes data storage.

Various modifications may be made to or based on the disclosed embodiments based on the teachings herein. For example, in some implementations the teachings herein may be employed to enable multiple controller devices to access a single memory device. In some implementations controller devices may be coupled to the memory device in an asymmetric manner. For example, one controller device may be coupled to a first interface of a memory device as discussed above while only the CA links (e.g., that include DQ and DM data multiplexed onto the links), the SL, and the CK link of another controller device may be coupled to a second interface of the memory device. In such a case, the memory devices may be configured to demultiplex and multiplex the CA signals to provide data access to the memory core.

In some implementations the teachings herein may be employed to enable a multiple controller device to access one or more DRAM and one or more nonvolatile memory devices (e.g., each of which includes multiple independent interfaces). Here, multiple nonvolatile devices may be coupled to different portions (e.g., subsets of the data bus) of a given interface of a controller device. In addition, in such implementations nonvolatile memory ports or other suitable ports (e.g., DM ports) may be used for DRAM arbitration/tracking.

The various structures and functions described herein may be implemented in various ways and using a variety of apparatuses. For example, a device may be implemented by various hardware components such a processor, a controller, a state machine, logic, or some combination of one or more of these components.

In some embodiments, code including instructions (e.g., software, firmware, middleware, etc.) may be executed on one or more processing devices to implement one or more of the described functions or components. The code and associated components (e.g., data structures and other components by the code or to execute the code) may be stored in an appropriate data memory that is readable by a processing device (e.g., commonly referred to as a computer-readable medium).

In some embodiments an apparatus constructed in accordance with the teachings herein may comprise a circuit description stored on a machine-readable media. Such a circuit description may implement, for example, one or more functions or components as taught herein.

The recited order of the blocks in the processes disclosed herein is simply an example of a suitable approach. Thus, operations associated with such blocks may be rearranged while remaining within the scope of the present disclosure. Similarly, the accompanying method claims present operations in a sample order, and are not necessarily limited to the specific order presented.

The components and functions described herein may be connected or coupled in various ways. The manner in which this is done may depend, in part, on whether and how the components are separated from the other components. In some embodiments some of the connections or couplings represented by the lead lines in the drawings may be in an integrated circuit, on a circuit board or implemented as discrete wires, or in some other way.

The signals discussed herein may take various forms. For example, in some embodiments a signal may comprise electrical signals transmitted over a wire, light pulses transmitted through an optical medium such as an optical fiber or air, or RF waves transmitted through a medium such as air, etc. In addition, a plurality of signals may be collectively referred to as a signal herein. The signals discussed above also may take the form of data. For example, in some embodiments an application program may send a signal to another application program. Such a signal may be stored in a data memory.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

While certain sample embodiments have been described above in detail and shown in the accompanying drawings, it is to be understood that such embodiments are merely illustrative of and not restrictive of the teachings herein. In particular, it should be recognized that the teachings herein may apply to a wide variety of apparatuses and methods. It will thus be recognized that various modifications may be made to the illustrated and other embodiments as taught herein, without departing from the broad inventive scope thereof. In view of the above it will be understood that the teachings herein are not limited to the particular embodiments or arrangements disclosed, but are rather intended to cover any changes, adaptations or modifications which are within the scope of the appended claims.

What is claimed is:

1. A memory controller device, comprising:
   a first memory interface configured to receive first control information from a first memory device, wherein the first control information indicates that another memory controller device accesses the first memory device;
   a second memory interface; and
   an access control circuit configured to access the first memory device via the first memory interface based on the first control information, and further configured to access a second memory device via the second memory interface.

2. The memory controller device of claim 1, wherein:
   in a first configuration, the access control circuit is configured to receive the first control information from the first memory device via the first memory interface and send second control information to the second memory device via the second memory interface; and
in a second configuration, the access control circuit is configured to send third control information to the first memory device via the first memory interface and receive fourth control information from the second memory device via the second memory interface.

3. The memory controller device of claim 1, wherein the first control information comprises at least one of the group consisting of: a command sent to the first memory device by the other memory controller device, opcode information, an address sent to the first memory device by the other memory controller device, address information, bank address information, row address information, page information, and pre-charging information.

4. The memory controller device of claim 1, wherein:
the first memory interface is further configured to directly connect to the first memory device and comprises at least one of the group consisting of: at least one first control and address port, at least one first data port, and at least one first clock port; and
the second memory interface is further configured to directly connect to the second memory device and comprises at least one of the group consisting of: at least one second control and address port, at least one second data port, and at least one second clock port.

5. The memory controller device of claim 1, wherein the access control circuit is further configured to prioritize accesses of the first memory device based on the first control information.

6. The memory controller device of claim 1, wherein the access control circuit is further configured to determine timing for accessing the first memory device based on the first control information.

7. The memory controller device of claim 1, wherein the access control circuit is further configured to send second control information to the first memory device via the first memory interface to access the first memory device.

8. The memory controller device of claim 7, wherein the first memory interface comprises at least one control and address port configured to:
receive the first control information if the access control circuit is not accessing the first memory device; and
send the second control information if the access control circuit is accessing the first memory device.

9. The memory controller device of claim 7, wherein the first memory interface comprises:
at least one tracking port configured to receive the first control information; and
at least one control and address port configured to send the second control information if the access control circuit is scheduled to access the first memory device.

10. The memory controller device of claim 1, further comprising a timing controller configured to define first phase timing for accessing the first memory device and second phase timing for accessing the second memory device.

11. The memory controller device of claim 1, wherein:
the second memory interface is configured to receive second control information from the second memory device; and
the access control circuit is further configured to access the second memory device via the second memory interface based on the second control information.

12. The memory controller device of claim 11, wherein the access control circuit comprises:
a first controller component;
a second controller component; and
a steering circuit for coupling the first controller component to the first memory interface and for coupling the second controller component to the second memory interface.

13. The memory controller device of claim 1, wherein the access control circuit comprises a plurality of independently operating controller components, wherein a first one of the controller components is configured to access the first memory device via the first memory interface and a second one of the controller components is configured to access the second memory device via the second memory interface.

14. The memory controller device of claim 1, wherein the access control circuit is further configured to send steering information to the first memory device to control whether the first memory device provides access to the memory controller device or to the other memory controller device.

15. The memory controller device of claim 1, wherein the first control information comprises opcode and memory bank information.

16. The memory controller device of claim 1, wherein:
the first control information comprises first arbitration information; and
the access control circuit is further configured to control access to the first memory device if the first arbitration information relates to the first memory device and control access to the second memory device if the first arbitration information relates to the second memory device.

17. The memory controller device of claim 16, wherein controlling access comprises at least one of the group consisting of: scheduling at least one access time and defining at least one access allocation.

18. The memory controller device of claim 16, wherein the first arbitration information comprises an arbitration message from the other memory controller device.

19. The memory controller device of claim 16, wherein the first arbitration information comprises a request to access the first memory device or the second memory device.

20. The memory controller device of claim 16, wherein the access control circuit is further configured to send second arbitration information to the second memory device via the second memory interface in response to the first arbitration information.

21. The memory controller device of claim 20, wherein the second arbitration information comprises an arbitration message directed to the other memory controller device.

22. The memory controller device of claim 21, wherein the access control circuit is further configured to send the second arbitration information to the second memory device during a period of time that the access control circuit is scheduled to conduct a memory access at the second memory device.

23. The memory controller device of claim 16, wherein the first memory interface comprises at least one control and address port configured to:
receive the first arbitration information if the access control circuit is not accessing the first memory device; and
send second control information to the first memory device if the access control circuit is accessing the first memory device.

24. The memory controller device of claim 16, wherein the first memory interface comprises:
at least one tracking port configured to receive the first arbitration information; and
at least one control and address port configured to send second control information to the first memory device during a period of time that the access control circuit is scheduled to access the first memory device.

25. The memory controller device of claim 16, wherein the access control circuit is further configured to receive the first arbitration information via the first memory interface during a period of time that the access control circuit is not scheduled to conduct a memory access at the first memory device.

26. The memory controller device of claim 1, wherein:
the first memory interface comprises a plurality of control ports;
the access control circuit is further configured to send second control information via the control ports during a memory access operation; and
the access control circuit is further configured to send calibration information via a first one of the control ports during a phase timing initialization operation and receive the calibration information via a second one of the control ports during the phase timing initialization operation.

27. A memory access method, comprising:
receiving, at a first memory interface of a memory controller device, first control information from a first memory device, wherein the first control information indicates that another memory controller device accesses the first memory device;
accessing the first memory device via the first memory interface based on the first control information; and
accessing a second memory device via a second memory interface of the memory controller device.

28. The method of claim 27, wherein:
in a first configuration, the first control information is received from the first memory device via the first memory interface and second control information is sent to the second memory device via the second memory interface; and
in a second configuration, third control information is sent to the first memory device via the first memory interface and fourth control information is received from the second memory device via the second memory interface.

29. The method of claim 27, wherein the first control information comprises at least one of the group consisting of: a command sent to the first memory device by the other memory controller device, opcode information, an address sent to the first memory device by the other memory controller device, address information, bank address information, row address information, page information, and precharging information.

30. The method of claim 27, wherein:
the first memory interface is configured to directly connect to the first memory device and comprises at least one of the group consisting of: at least one first control and address port, at least one first data port, and at least one first clock port; and
the second memory interface is configured to directly connect to the second memory device and comprises at least one of the group consisting of: at least one second control and address port, at least one second data port, and at least one second clock port.

31. The method of claim 27, further comprising prioritizing accesses of the first memory device based on the first control information.

32. The method of claim 27, further comprising sending second control information to the first memory device via the first memory interface to access the second memory device.

33. The method of claim 32, wherein the first memory interface comprises at least one control and address port configured to:
receive the first control information if the memory controller device is not accessing the first memory device; and
send the second control information if the memory controller device is accessing the first memory device.

34. The method of claim 32, wherein the first memory interface comprises:
at least one tracking port configured to receive the first control information; and
at least one control and address port configured to send the second control information if access to the first memory device is scheduled.

35. The method of claim 27, further comprising receiving, at the second memory interface, second control information from the second memory device, wherein the second memory device is accessed via the second memory interface based on the second control information.

36. The method of claim 27, further comprising sending steering information to the first memory device to control whether the first memory device provides access to the memory controller device or to the other memory controller device.

37. The method of claim 27, wherein the first control information comprises first arbitration information, the method further comprising:
controlling access to the first memory device if the first arbitration information relates to the first memory device; and
controlling access to the second memory device if the first arbitration information relates to the second memory device.

38. The method of claim 37, wherein controlling access comprises at least one of the group consisting of: scheduling at least one access time and defining at least one access allocation.

39. The method of claim 37, wherein the first arbitration information comprises an arbitration message from the other memory controller device.

40. The method of claim 37, further comprising sending second arbitration information to the second memory device via the second memory interface in response to the first arbitration information.

41. The method of claim 40, wherein the second arbitration information comprises an arbitration message directed to the other memory controller device, the method further comprising sending the second arbitration information to the second memory device during a period of time that access to the second memory device is scheduled.

42. The method of claim 37, wherein the first memory interface comprises at least one control and address port configured to:
receive the first arbitration information if the memory controller device is not accessing the first memory device; and
send second control information to the first memory device if the memory controller device is accessing the first memory device.

43. The method of claim 37, wherein the first memory interface comprises:
at least one tracking port configured to receive the first arbitration information; and
at least one control and address port configured to send second control information to the first memory device during a period of time that access to the first memory device is scheduled.

44. The method of claim 27, wherein the first memory interface comprises a plurality of control ports, the method further comprising:

sending second control information via the control ports during a memory access operation;

sending calibration information via a first one of the control ports during a phase timing initialization operation; and receiving the calibration information via a second one of the control ports during the phase timing initialization operation.

45. A memory control apparatus, comprising:

first memory interface means for receiving first control information from a first memory device, wherein the first control information indicates that another memory control apparatus accesses the first memory device;

second memory interface means; and means for accessing the first memory device via the first memory interface means based on the first control information, and for accessing a second memory device via the second memory interface means, wherein the means for accessing is coupled to the first memory interface means and the second memory interface means.

* * * * *